US009347814B2

(12) United States Patent
Yokoyama et al.

(10) Patent No.: US 9,347,814 B2
(45) Date of Patent: May 24, 2016

(54) LIQUID CONSUMING APPARATUS AND METHOD FOR CONTROLLING LIQUID CONSUMING APPARATUS

(71) Applicant: Seiko Epson Corporation, Tokyo (JP)

(72) Inventors: Hidetoshi Yokoyama, Suwa (JP); Masaki Tsukida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/620,883

(22) Filed: Feb. 12, 2015

(65) Prior Publication Data

US 2015/0241265 A1    Aug. 27, 2015

(30) Foreign Application Priority Data

Feb. 25, 2014   (JP) ................. 2014-034095

(51) Int. Cl.
G01N 21/00   (2006.01)
G01F 25/00   (2006.01)
G01F 23/292  (2006.01)

(52) U.S. Cl.
CPC ........ G01F 25/0076 (2013.01); G01F 23/2922 (2013.01)

(58) Field of Classification Search
USPC ................................. 356/432–442
See application file for complete search history.

(56) References Cited

U.S. PATENT DOCUMENTS 6,012,795 A    1/2000  Sato et al.
2013/0233047 A1  9/2013  Sato

FOREIGN PATENT DOCUMENTS

| JP | 05-332812 A | 12/1993 |
| JP | 2002-130655 A | 5/2002 |
| JP | 2013-188879 A | 9/2013 |
| JP | 2014-018992 A | 2/2014 |
| JP | 2014-141017 A | 8/2014 |

*Primary Examiner* — Tri T Ton

(57) ABSTRACT

A liquid consuming apparatus includes a photosensor 80 having a light-emitting portion 82 and a light-receiving portion 84, a holder 21 capable of attachably and detachably holding a liquid container in which a prism 320 having a face that faces the photosensor 80 is arranged, and a determination unit (a failure determination unit 120) that determines status of the photosensor 80 based on the output of the photosensor 80. When the liquid container is installed in the holder 21, the determination unit detects a failure of the photosensor 80 based on a detection signal of the photosensor 80 in the case of causing the light-emitting portion 82 to emit light, and a detection signal of the photosensor 80 in the case of causing the light-emitting portion 82 to turn off the light.

9 Claims, 22 Drawing Sheets

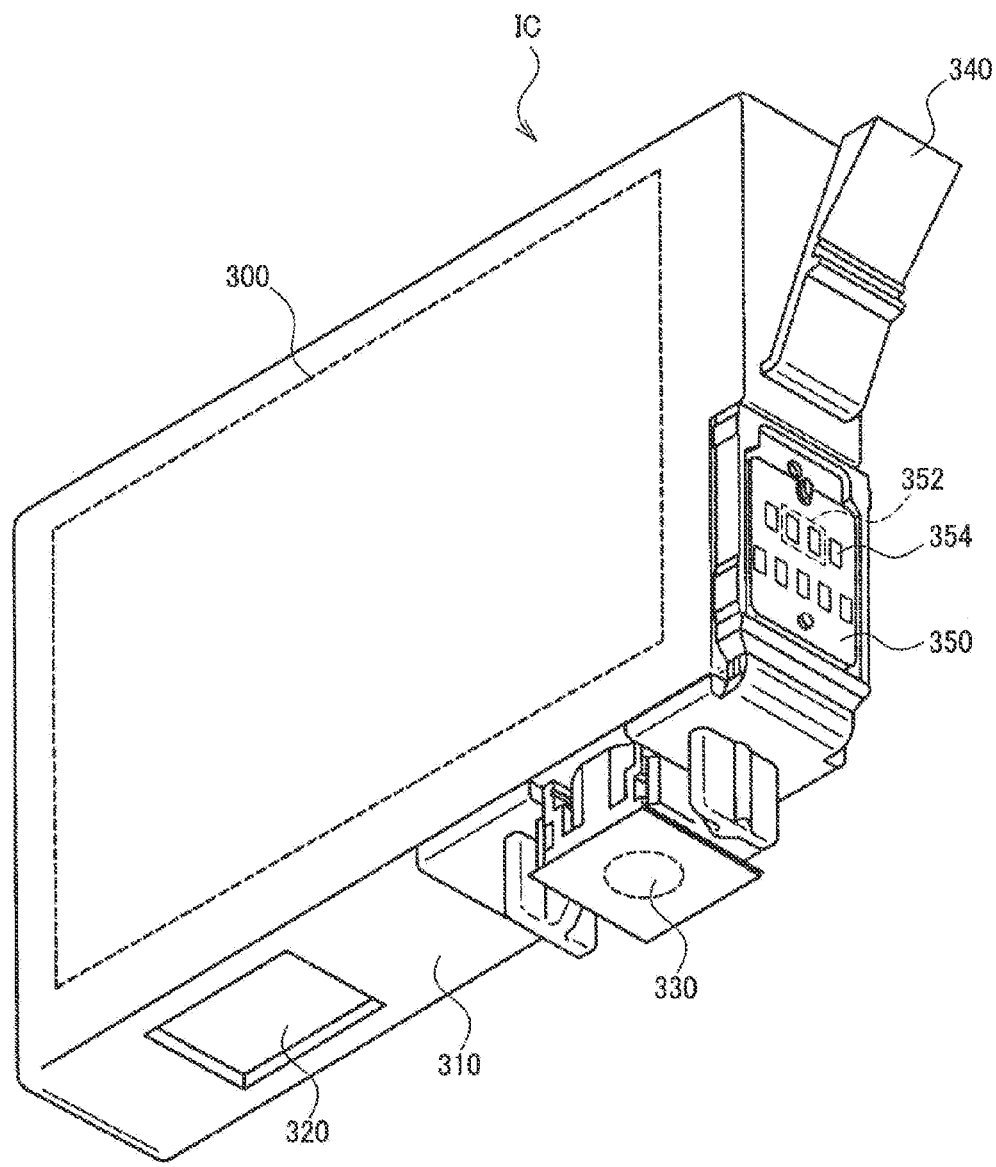
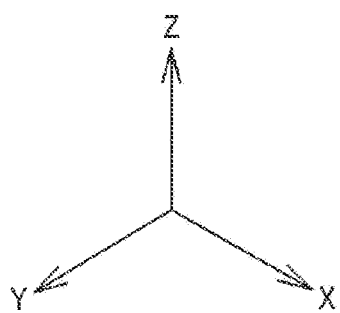
FIG. 4

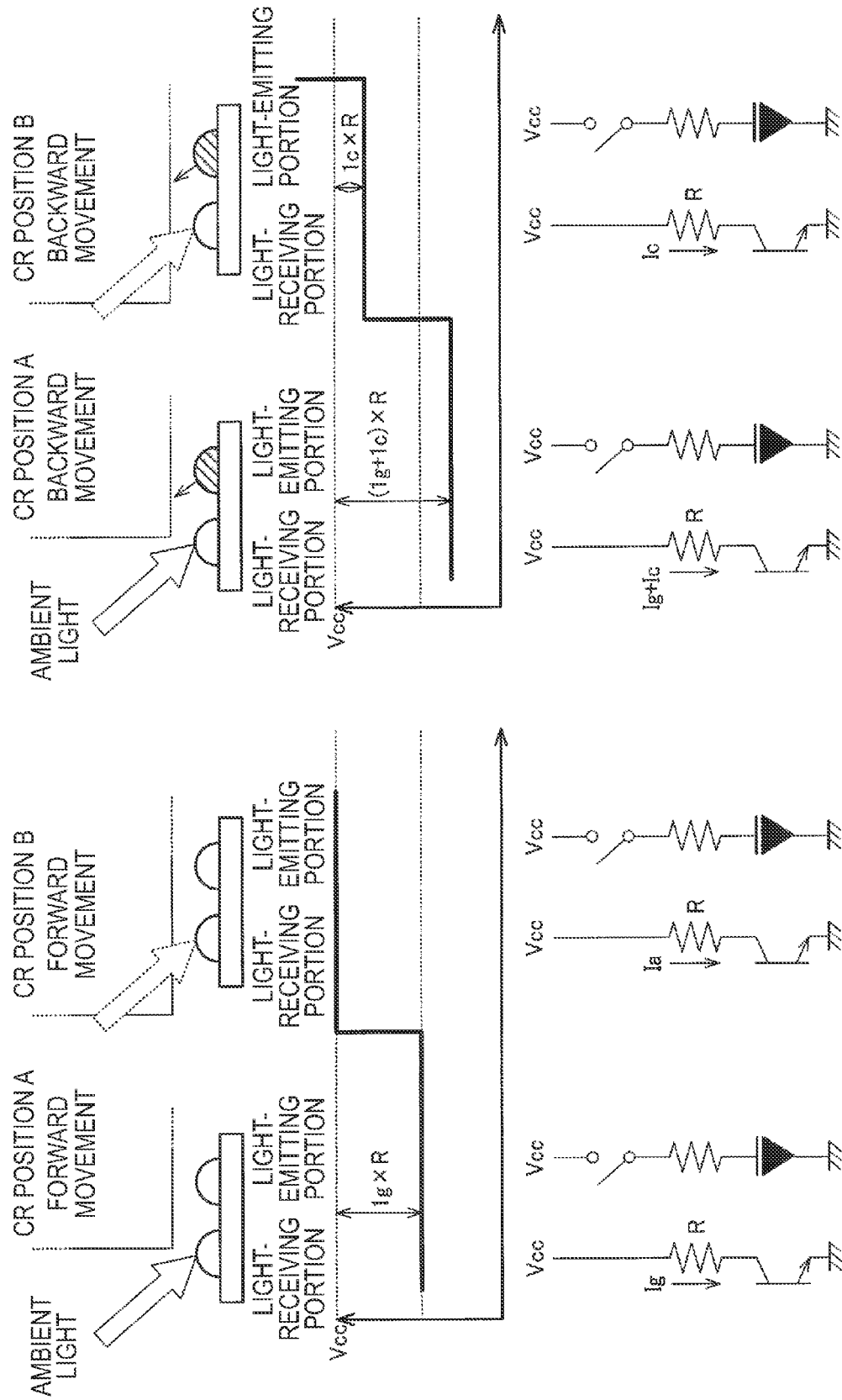

LIQUID CONSUMING APPARATUS AND METHOD FOR CONTROLLING LIQUID CONSUMING APPARATUS

BACKGROUND

1. Technical Field

The present invention relates to a liquid consuming apparatus, a method for controlling a liquid consuming apparatus, and the like.

2. Related Art

For example, JP-A-5-332812 discloses an ink detection device with which an optical path member whose refractive index is close to that of ink is provided in an ink cartridge, light from a light-emitting portion is transmitted through the ink from the optical path member if the ink cartridge inside the optical path member is filled with the ink, and the light from the light-emitting portion is totally reflected at an inner face of the optical path member and the totally reflected light is detected by a light-receiving portion if the ink cartridge inside the optical path member contains no ink and is empty.

JP-A-2013-188879 discloses a technique by which, in an apparatus that determines remaining status of ink or the like using a photosensor, processing for detecting a failure of the sensor is performed, and processing for determining the remaining status is changed when a sensor failure is detected and when it is not detected.

When the remaining status of liquid such as ink is determined using light as in JP-A-5-332812 and JP-A-2013-188879, it is conceivable to use a photosensor having a light-emitting portion and a light-receiving portion. In this case, if light detection processing cannot be performed with sufficient accuracy due to occurrence of a failure or the like in the photosensor, the accuracy of the determination of the remaining status of liquid using this photosensor will also be low. For this reason, JP-A-2013-188879 proposes a remaining status determination technique that takes a sensor failure into consideration.

However, in JP-A-2013-188879, a sensor failure is detected at the position of a failure detection plate, based on the light received by the light-receiving portion while the light-emitting portion is caused to emit light. Specifically, failure determination is realized by simple processing, which is comparison between a signal value in this state and a given reference signal value. For this reason, a system is not disclosed that identifies each failure mode, or detects adverse influence of outdoor light or other factors that affect the remaining status determination.

SUMMARY

According to some aspects of the invention, it is possible to provide a liquid consuming apparatus, a method for controlling a liquid consuming apparatus, and the like with which a sensor failure and other factors that adversely affect processing using a photosensor are intelligently detected by using a detection signal in the case of causing a light-emitting portion to emit light and a detection signal in the case of causing the light-emitting portion to turn off the light.

An aspect of the invention relates to a liquid consuming apparatus including: a photosensor having a light-emitting portion and a light-receiving portion; a holder capable of attachably and detachably holding a liquid container in which a prism having a face that faces the photosensor is arranged; and a determination unit that determines status of the photosensor based on a detection signal of the photosensor. When the liquid container is installed in the holder, the determination unit detects a failure of the photosensor based on the detection signal of the photosensor in the case of causing the light-emitting portion to emit light, and the detection signal of the photosensor in the case of causing the light-emitting portion to turn off the light.

In an aspect of the invention, a failure of the photosensor is detected based on the detection signal in the case of causing the light-emitting portion to emit light and the detection signal in the case of causing the light-emitting portion to turn off the light. Accordingly, since a detection signal obtained in a situation different from that at the time of emitting light can also be used in the processing, it is possible to intelligently detect a failure, e.g., to more specifically identify the content of the failure, as compared with a technique of detecting a failure using only a detection signal at the time of emitting light.

In an aspect of the invention, the determination unit may determine the status of the photosensor based on the detection signal of the photosensor obtained due to the light-receiving portion of the photosensor receiving reflection light that is radiated from the light-emitting portion of the photosensor and reflected at a bottom face of the prism.

With this configuration, failure detection processing can be performed, for example, without providing a member for failure detection, such as a failure detection plate.

In an aspect of the invention, the determination unit may determine that the photosensor has failed if it is determined that detection current of the photosensor in the case of causing the light-emitting portion to turn off the light is larger than or equal to a first threshold value.

With this configuration, failure detection can be performed by comparing the detection current at the time of turning off the light with the threshold value.

In an aspect of the invention, the determination unit may determine that the photosensor has failed if a difference value between the level of the detection signal of the photosensor in the case of causing the light-emitting portion to emit light and the level of the detection signal of the photosensor in the case of causing the light-emitting portion to turn off the light is smaller than or equal to a second threshold value.

With this configuration, failure detection can be performed by comparing the difference value between the detection signal at the time of emitting light and the detection signal at the time of turning off the light with the threshold value.

In an aspect of the invention, the determination unit may determine that ambient light is present if a failure of the photosensor is not detected and a difference value between the level of the detection signal of the photosensor in the case of causing the light-emitting portion to turn off the light and a given reference level is larger than or equal to a third threshold value.

With this configuration, it can be determined whether or not ambient light is present by comparing the difference value between the detection signal at the time of turning off the light and the given reference level with the threshold value.

In an aspect of the invention, the holder may hold first to Nth liquid containers that are arranged in line in a main scanning direction, and the determination unit may acquire the detection signal of the photosensor corresponding to each of the first to Nth liquid containers at the time of relatively moving the photosensor and the holder, and determine that ambient light is present if a difference value between the detection signal of the photosensor corresponding to at least one of the first liquid container and the Nth liquid container and the detection signal of the photosensor corresponding to a kth (k is an integer that satisfies 1<k<N) liquid container is larger than or equal to a fourth threshold value.

With this configuration, it can be determined whether or not ambient light is present by comparing the difference value between the detection signal of the photosensor corresponding to a given liquid container and the detection signal of the photosensor corresponding to another liquid container with the threshold value.

In an aspect of the invention, the holder may hold first to Nth liquid containers that are arranged in line in a main scanning direction, and the determination unit may acquire the detection signal of the photosensor corresponding to each of the first to Nth liquid containers at the time of relatively moving the photosensor and the holder, and perform processing for detecting leakage current based on the detection signal of the photosensor corresponding to a kth (k is an integer that satisfies 1<k<N) liquid container in the case of causing the light-emitting portion to turn off the light.

With this configuration, leakage current detection processing can be performed based on the detection signal of the photosensor corresponding to a given liquid container at the time of turning off the light.

In an aspect of the invention, the determination unit may cause the photosensor to turn off the light, relatively move the holder and the photosensor in a predetermined direction, and acquire the detection signal in the case of causing the photosensor to turn off the light, and the determination unit may cause the photosensor to emit light, relatively move the holder and the photosensor in a direction opposite to the predetermined direction, and acquire the detection signal in the case of causing the photosensor to emit light.

With this configuration, the detection signal at the time of emitting light and the detection signal at the time of turning off the light can be efficiently acquired, for example, through relative movement in the predetermined direction and relative movement in the direction opposite to the predetermined direction.

Another aspect of the invention relates to a method for controlling a liquid consuming apparatus including a photosensor having a light-emitting portion and a light-receiving portion, and a holder capable of attachably and detachably holding a liquid container in which a prism having a face that faces the photosensor is arranged. The method includes detecting, when the liquid container is installed in the holder, a failure of the photosensor based on a detection signal of the photosensor in the case of causing the light-emitting portion to emit light, and a detection signal of the photosensor in the case of causing the light-emitting portion to turn off the light.

BRIEF DESCRIPTION OF THE DRAWINGS

FIG. 4 is a perspective view showing a main part of an ink cartridge.

FIGS. 16A and 16B are diagrams illustrating a difference between when light is emitted and when the light is turned off, and a difference in the case of changing the relative positional relationship between the carriage and the photosensor.

DESCRIPTION OF EXEMPLARY EMBODIMENTS

Figure 1:
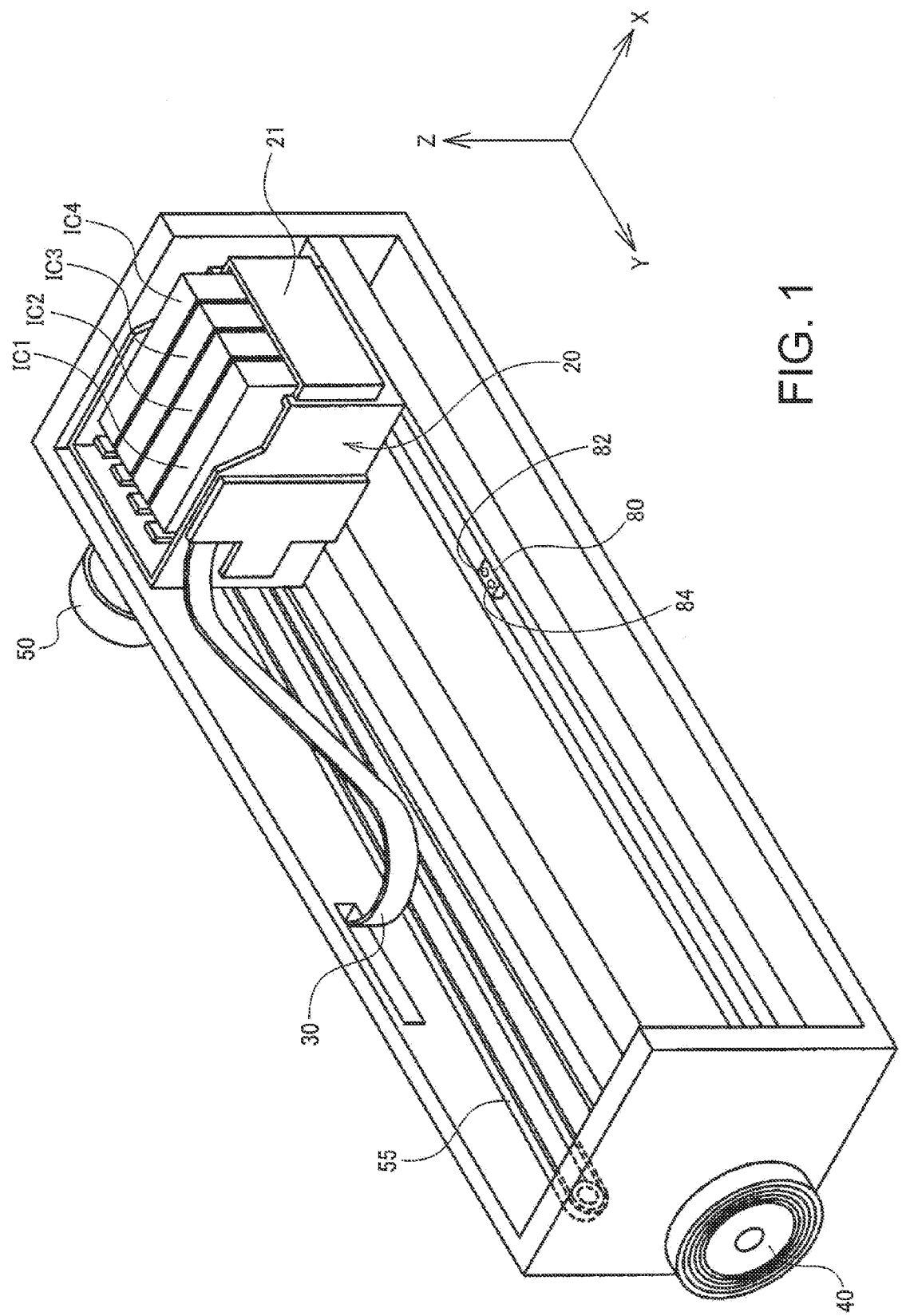
FIG. 1 is a perspective view showing a main part of a printer according to the present embodiment.

Hereinafter, the present embodiment will be described. Note that the present embodiment described below is not intended to unjustly limit the content of the invention described in the scope of claims. Not all configurations described in the present embodiment necessarily are essential constituent elements of the invention.

1. Technique in Present Embodiment.

First, a technique in the present embodiment will be described. As disclosed in JP-A-5-332812, a technique of determining the remaining status of liquid (i.e., a technique of determining an ink near-end state) using a photosensor is known. With this technique, the photosensor needs to accurately detect light. If a failure or the like occurs in the photosensor, the result of the remaining status determination using this photosensor will be less accurate.

As disclosed in JP-A-2013-188879, various techniques of detecting a failure of the photosensor are also known. In JP-A-2013-188879, with a failure detection plate, which is constituted by a mirror that totally reflects light, located at a position immediately above the photosensor, a failure is detected using a detection signal of a light-receiving portion in a state where a light-emitting portion is caused to emit light. Specifically, a predetermined voltage value range is set in advance, and it is determined that the photosensor is normal if the voltage value is within this range, and it is determined that the photosensor has failed if the voltage value is out of the range.

However, with this technique, the content of each failure cannot be specifically identified. Specifically, it can be estimated that the content of failures is different between when the voltage value is larger than a predetermined voltage value (the upper limit value in the aforementioned range) and when the voltage value is smaller than a predetermined voltage value (the lower limit value in the aforementioned range). However, further identification cannot be performed.

Furthermore, with the failure detection technique in JP-A-2013-188879, the light-emitting portion is in a state of emitting light. However, if the influence of ambient light needs to be taken into consideration, a situation may possibly occur where the determination only in the light emitting state cannot be considered to be sufficient. The ambient light mentioned here refers to light that enters the inside of the liquid consuming apparatus from the outside, for example, and specifically is the light detected in a state where the cover of the liquid consuming apparatus is open.

Ideally, the remaining status determination is performed using reflected light that is emitted by the light-emitting portion and reflected at some member (in JP-A-2013-188879, a prism). Light such as ambient light originally is not desired to be detected in the remaining status determination, whereas it is favorable to detect such light similarly to a sensor failure, in terms of the adverse influence on the remaining status determination.

However, with the failure detection in a state of causing the light-emitting portion to emit light, it cannot be identified whether the detected light is the light emitted from the light-emitting portion or ambient light. For this reason, although it can be found that there is a possibility of an incorrect failure detection result, or that the remaining status determination will be adversely affected, there could be a possibility that it cannot be identified whether such an incorrect result or adverse influence is caused by a sensor failure or ambient light or the like.

The present inventor proposes a technique of separately detecting a failure of the photosensor, ambient light, and other factors that adversely affect the remaining status determination. Specifically, as shown in FIG. 1, a liquid consuming apparatus according to the present embodiment includes a photosensor 80 having a light-emitting portion 82 and a light-receiving portion 84, a holder 21 capable of attachably and detachably holding liquid containers (corresponding to IC1 to IC4) in each of which a prism having a face that faces the photosensor 80 is arranged, and a determination unit (corresponding to a failure determination unit 120 in FIG. 5) that determines the status of the photosensor 80 based on a detection signal of the photosensor 80. Here, the prism in each liquid container (liquid containing portion) faces the photosensor when the liquid container is installed in the holder 21. When each liquid container is installed in the holder 21, the determination unit detects a failure of the photosensor 80 based on a detection signal of the photosensor 80 in the case of causing the light-emitting portion 82 to emit light, and a detection signal of the photosensor 80 in the case of causing the light-emitting portion 82 to turn off the light.

The influence of the light emitted from the light-emitting portion 82 on the failure determination can be suppressed by using the detection signal in the case of causing the light-emitting portion 82 to turn off the light. For example, when excessive current flows through a photodiode of the photosensor as described later, it can be determined that a ground shorting error has occurred. However, if the light-emitting portion 82 is emitting light, this excessive current also includes the current generated due to the light from the light-emitting portion 82, i.e., the light that is also detected in a normal state, and accordingly the resolution in the failure detection decreases. In this regard, the light that is also detected in a normal state is eliminated by turning off the light of the light-emitting portion 82, and accordingly it can be accurately determined whether or not the amount of current is abnormally large.

Furthermore, it is also possible to suppress the influence of ambient light or the like and accurately obtain a signal value generated due to the light from the light-emitting portion 82, for example, by using a difference between a detection signal in the case where the light-emitting portion 82 emits light and a detection signal in the case where the light of the light-emitting portion 82 is turned off. The details of the failure detection technique in the present embodiment will be described later.

In the present embodiment, the determination unit may determine the status of the photosensor 80 based on a detection signal of the photosensor 80 obtained as a result of the light-receiving portion 84 of the photosensor 80 receiving the reflected light that is emitted from the light-emitting portion 82 of the photosensor 80 and reflected at the bottom face (a face EF in FIG. 6) of the prism.

For example, the failure detection can be performed by causing the light-emitting portion 82 to emit light in a state where the positional relationship between the holder 21 and the photosensor 80 is the same as the positional relationship at the time of performing the remaining status determination (or in a range of positional relationships that are close thereto to some extent). With this operation, unlike in JP-A-2013-188879, a failure detection plate does not have to be provided, and it is possible to reduce the number of parts and the size of the holder 21.

As described later using FIG. 6 and the like, the remaining status determination is performed based on whether or not the light reflects at a face SF1 or SF2 of the prism. However, the light from the light-emitting portion 82 does not entirely pass through the prism bottom face EF, and also includes light that is reflected by the prism bottom face EF and received by the light-receiving portion. This corresponds to Spk1 or Spk2 in a waveform in later-described FIG. 8, and appears as a characteristic signal as can be found in FIG. 8. That is to say, the prism and the holder having openings, which are parts used in the remaining status determination, can also be used in the failure detection, and dedicated parts for the failure detection do not have to be provided.

Also, the determination unit may acquire a detection signal in the case of causing the light-emitting portion 82 to turn off the light by turning off the light of the light-emitting portion 82 and relatively moving the holder 21 and the photosensor 80 in a predetermined direction, and acquire a detection signal in the case of causing the light-emitting portion 82 to emit light by causing the light-emitting portion 82 to emit light and relatively moving the holder 21 and the photosensor 80 in a direction opposite to the predetermined direction.

Figure 8:
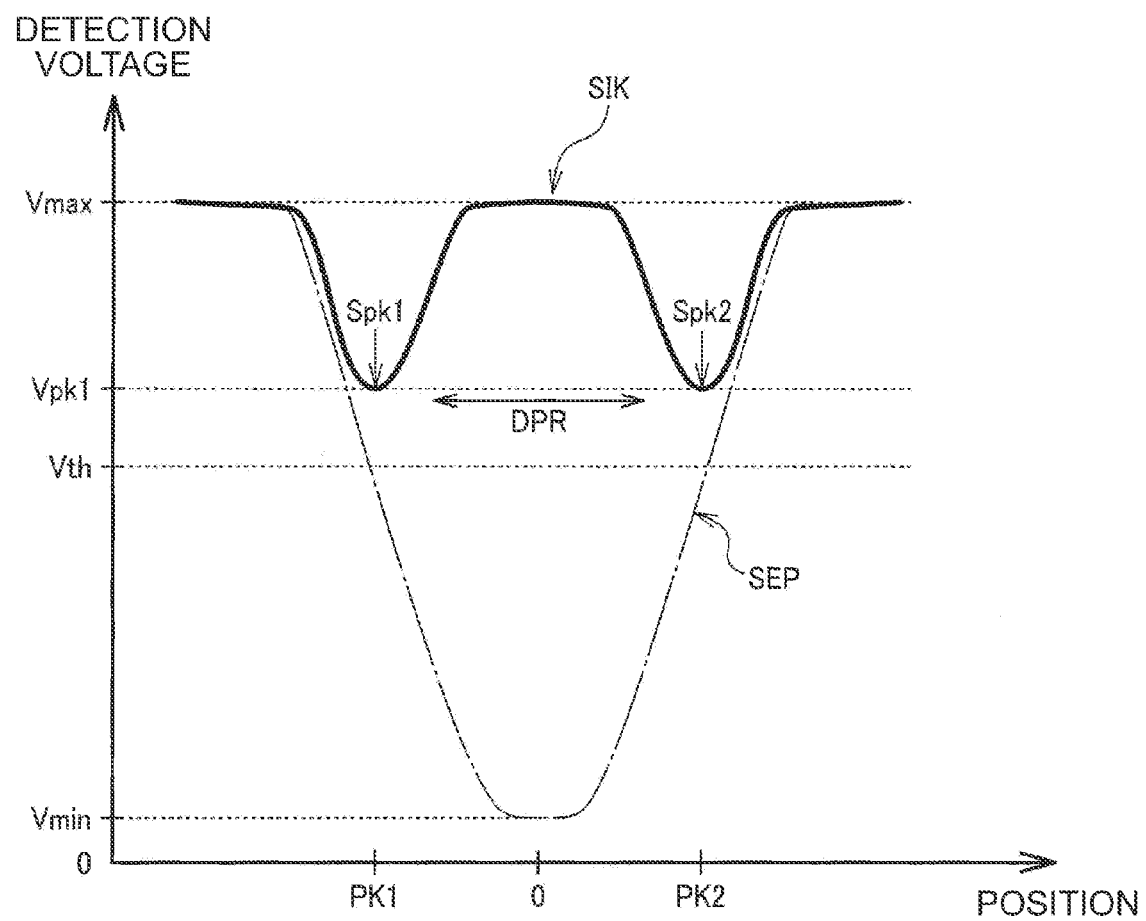
FIG. 8 shows an exemplary characteristic of detection voltage.

As described later, a voltage value Vpk1 or the like at the peak in the waveform in FIG. 8 is used as the detection signal for detecting a failure. For this reason, although a signal obtained in a state where the holder 21 and the photosensor 80 are in a given positional relationship may be used in the processing, a technique is favorable in which a signal is detected while varying the relative positional relationship between the holder 21 and the photosensor 80, and a peak is found therefrom.

In this case, it is assumed that the holder 21 and the photosensor 80 relatively move in a predetermined direction for the failure detection from a state where they are in a reference relative positional relationship, and thereafter they relatively move in a direction opposite to the predetermined direction in order to return to the aforementioned reference relative positional relationship. That is to say, when a reference relative positional relationship exists and any relative movement occurs, if it can be presumed that the reference positional relationship is thereafter restored, there are two chances to acquire the signal for the failure detection in the forward movement and the backward movement during the relative movement. In the present embodiment, since the detection signals need to be acquired when the light-emitting portion 82 emits light and when the light of the light-emitting portion 82 is turned off, as mentioned above, one of the forward movement and the backward movement is assigned to light emission, and the other one is assigned to the turning-off of the light. It is thereby possible to suppress unnecessary relative movement and efficiently acquire the signals for the failure detection Hereinafter, a liquid consuming apparatus in the present embodiment will be described in detail. A description will be given first of a basic configuration of the liquid consuming apparatus and an exemplary configuration of the ink cartridges, thereafter of an exemplary detailed configuration of the liquid consuming apparatus, and further of a technique of determining the remaining status of liquid (an ink near-end detection technique). Thereafter, a failure detection technique of the photosensor 80 according to the present embodiment will be described, and lastly the timing of performing the failure detection processing (in relation to other processing) will be described.

2. Basic Configuration of Printer, Ink Cartridges

FIG. 1 is a perspective view showing a main part of a printer (a liquid consuming apparatus) in the present embodiment. An X direction, a Y direction, and a Z direction that are orthogonal to one another are shown in FIG. 1. In a normal usage posture of the printer, a frontward direction of the printer is the X direction, and the vertical direction is the Z direction. For example, taking the X direction as an example, the direction of the arrow will be referred to as a +X direction (or simply an X direction), and the opposite direction will be referred to as a −X direction.

The printer in FIG. 1 includes ink cartridges IC1 to IC4 (liquid vessels, liquid containers), a carriage 20 provided with a holder 21 in which the ink cartridges IC1 to IC4 are attachably and detachably accommodated, a cable 30, a paper feed motor 40, a carriage motor 50, a carriage drive belt 55, and a photosensor 80 (a detection portion). Note that the holder 21 and the carriage 20 may be formed as an integrated member, or may be formed as separate members and the holder 21 may be attached to the carriage 20.

The ink cartridges IC1 to IC4 each contain ink (liquid, printing agent) of a single color. The ink cartridges IC1 to IC4 are attachably and detachably installed in the holder 21. A head is provided in a face of the carriage 20 on the side in the −Z direction. The ink supplied from the ink cartridges IC1 to IC4 is discharged from the head toward a recording medium. The recording medium is printing paper, for example. The carriage 20 is connected to a control unit (a control unit 100 in later-described FIG. 5) by the cable 30, and discharging control is performed by the control unit via this cable 30. The paper feed motor 40 drives a paper feed roller (a paper feed roller 45 in FIG. 5) to rotate, and sends printing paper in the X direction shown in FIG. 1. The carriage motor 50 drives a carriage drive belt 55 and moves the carriage 20 in the ±Y direction. A printing operation is performed by the control unit controlling the aforementioned discharging, paper feed, and movement of the carriage 20.

Note that, hereinafter, the ±Y direction in which the carriage 20 is moved will be referred to as a "main scanning direction", and the X direction in which the printing paper is fed will be referred to as a "sub-scanning direction".

The photosensor 80 outputs a signal for detecting the remaining status of the ink in the ink cartridges IC1 to IC4. Specifically, the photosensor 80 includes a light-emitting portion 82 (a light-emitting device) that radiates light to a prism (a prism 320 in later-described FIG. 4) provided in each of the ink cartridges IC1 to IC4, and a light-receiving portion 84 (a light-receiving device) that receives reflected light from the prism and converts it into an electric signal. For example, the light-emitting portion 82 is constituted by an LED (Light-Emitting Diode), and the light-receiving portion 84 is constituted by a phototransistor.

Figure 2:
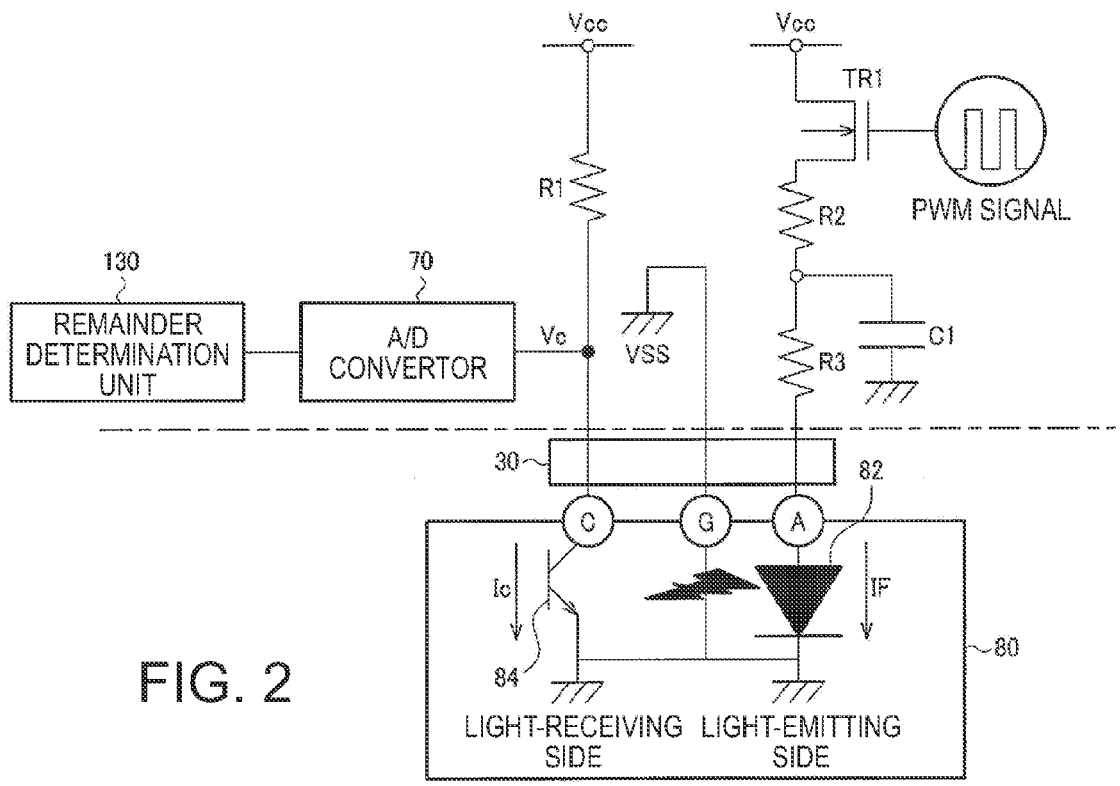
FIG. 2 shows an exemplary detailed configuration of a photosensor.

FIG. 2 shows an exemplary detailed configuration of the photosensor 80. The photosensor 80 is configured as a reflection photo-interrupter, and has the light-emitting portion 82 and the light-receiving portion 84. The photosensor 80 has an LED as the light-emitting portion 82, and has a phototransistor as the light-receiving portion 84. An emitter terminal of the phototransistor is grounded to ground potential VSS, and a collector terminal thereof is connected to power supply potential Vcc via a resistor element R1.

The potential between the resistor element R1 and the collector terminal is input as output voltage Vc (a light reception result signal) of the photosensor 80 to an A/D convertor 70. The output voltage subjected to A/D conversion is input to a remainder determination unit 130. The amount of the light radiated by the light-emitting portion 82 is set as a result of a duty ratio (a ratio between the on-time and the off-time) of a PWM (Pulse Width Modulation) signal applied to the light-emitting portion 82 via a transistor TR1, resistor elements R2 and R3, and a capacitor C1 being adjusted by the control unit 100. Upon the light radiated from the light-emitting portion 82 being reflected at the prism 320 in each of the ink cartridges IC1 to IC4 and received by the light-receiving portion 84, the output voltage Vc corresponding to the amount of the received light is input to the remainder determination unit 130 via the later-described A/D convertor. In the present embodiment, the larger the amount of the light received by the light-receiving portion 84 is, the lower the output voltage Vc output from the photosensor 80 is.

Figure 3:
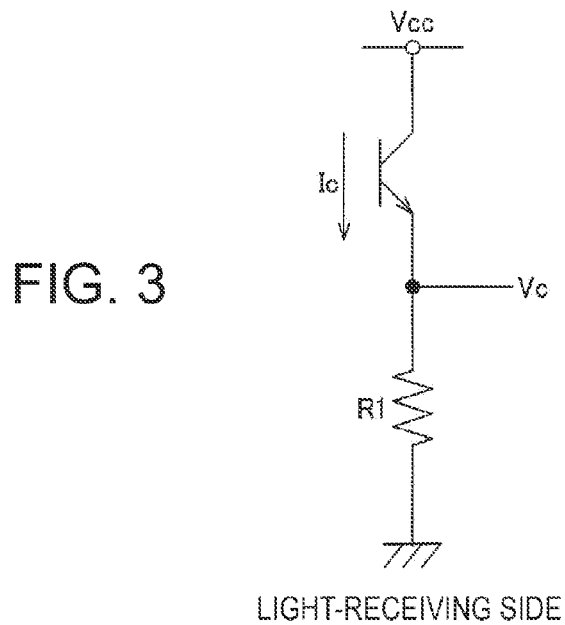
FIG. 3 shows another exemplary configuration of a light-receiving portion of the photosensor.

However, the configuration of the light-receiving portion 84 is not limited to that in FIG. 2, and the relationship between the amount of the light received by the light-receiving portion 84 and a detection signal of the photosensor 80 (the light-receiving portion 84) is not limited to the above-described relationship either. For example, with the configuration of the light-receiving portion 84 shown in FIG. 3, the larger the amount of the light received by the light-receiving portion 84 is and the larger the amount of generated current is, the larger the difference between the output voltage Vc and the ground potential VSS is. That is to say, the larger the amount of the light received by the light-receiving portion 84 is, the higher the output voltage Vc output from the photosensor 80 is.

Considering that the photosensor 80 originally is for detecting the amount of incident light and the light-receiving portion 84 is a device that converts light into current, the output of the photosensor 80 may be considered to be essentially the amount of current generated at the light-receiving portion 84. Considering it to be the amount of current, a relationship is established in which the stronger the incident light is, the larger the output current is. Accordingly, the amount of incident light can be determined regardless of the configuration. The following is a description of an example in which the configuration of the light-receiving portion 84 shown in FIG. 2 is employed, and it is accordingly assumed that the larger the amount of incident light is, the larger the amount of generated current is and the lower the output voltage Vc is. However, "the output voltage being low (high)" in the following description can be essentially considered to be "the amount of generated current being large (small)", and the form of the output signal that the amount of current is detected in can be modified in various manners.

FIG. 4 is a perspective view showing a main part of each of the ink cartridges IC1 to IC4. The ink cartridge IC shown in FIG. 4 corresponds to each of the ink cartridges IC1 to IC4 in FIG. 1.

The ink cartridge IC includes a rectangular parallelepiped (including substantially rectangular parallelepiped) ink containing portion 300 that contains the ink, a circuit board 350 (a board), a lever 340 for attaching and detaching the ink cartridge IC to/from the holder 21, an ink supply port 330 through which the ink is supplied to the head, and a prism 320 provided in a bottom face 310 of the ink cartridge IC. A storage device 352 that stores information regarding the ink cartridge IC is installed on the back face of the circuit board 350. A plurality of terminals 354 that are electrically connected to the storage device 352 are arranged in a front face of the circuit board 350. These terminals 354 are electrically connected to the control unit (the control unit 100 in FIG. 5) on the side of the apparatus body via a plurality of apparatus body terminals provided in the holder 21, when the ink cartridge IC is installed in the holder 21. As the storage device 352, for example, a nonvolatile memory such as an EEPROM can be used.

The prism 320 is constituted by a transparent member with respect to the light from the light-emitting portion 82, and is made of polypropylene, for example. The prism 320 is provided such that an incident face thereof that the light from the light-emitting portion 82 enters is exposed from the bottom face 310 of the ink cartridge IC. The bottom face 310 is a face oriented to the side in the −Z direction when the ink cartridges IC are installed in the holder 21 in FIG. 1, and the holder 21 is provided with openings for causing the light from the light-emitting portion 82 to enter the incident face of the prism 320. That is to say, upon the carriage 20 provided with the holder 21 moving in the main scanning direction (in the ±Y direction) in FIG. 1, the ink cartridges IC1 to IC4 sequentially pass above (in the +Z direction) the photosensor 80, and the reflected light from the prism 320 in each ink cartridge is received by the light-receiving portion 84. The photosensor 80 then outputs a result of light reception by the light-receiving portion 84 as a sensor output signal (a light reception result signal) corresponding to the position of the carriage 20. In the present embodiment, an ink near-end state of each ink cartridge is detected based on the sensor output signal corresponding to the position of the carriage 20.

Here, an "ink near-end state" refers to a state where the remaining amount or the liquid surface level of the ink contained in the ink containing portion 300 falls below a predetermined value, and a small amount of the ink is left in the ink cartridge IC. For example, it is a state where there is a possibility that the head enters an idle ejection state, i.e., the head does not discharge ink when printing is continued after an ink near-end state is detected and the amount of consumed ink estimated by a remaining amount estimation unit 160, which will be described later in FIG. 5 (the amount of ink consumed after the ink near-end state is detected), exceeds a predetermined amount.

3. Detailed Configuration of Printer

Figure 5:
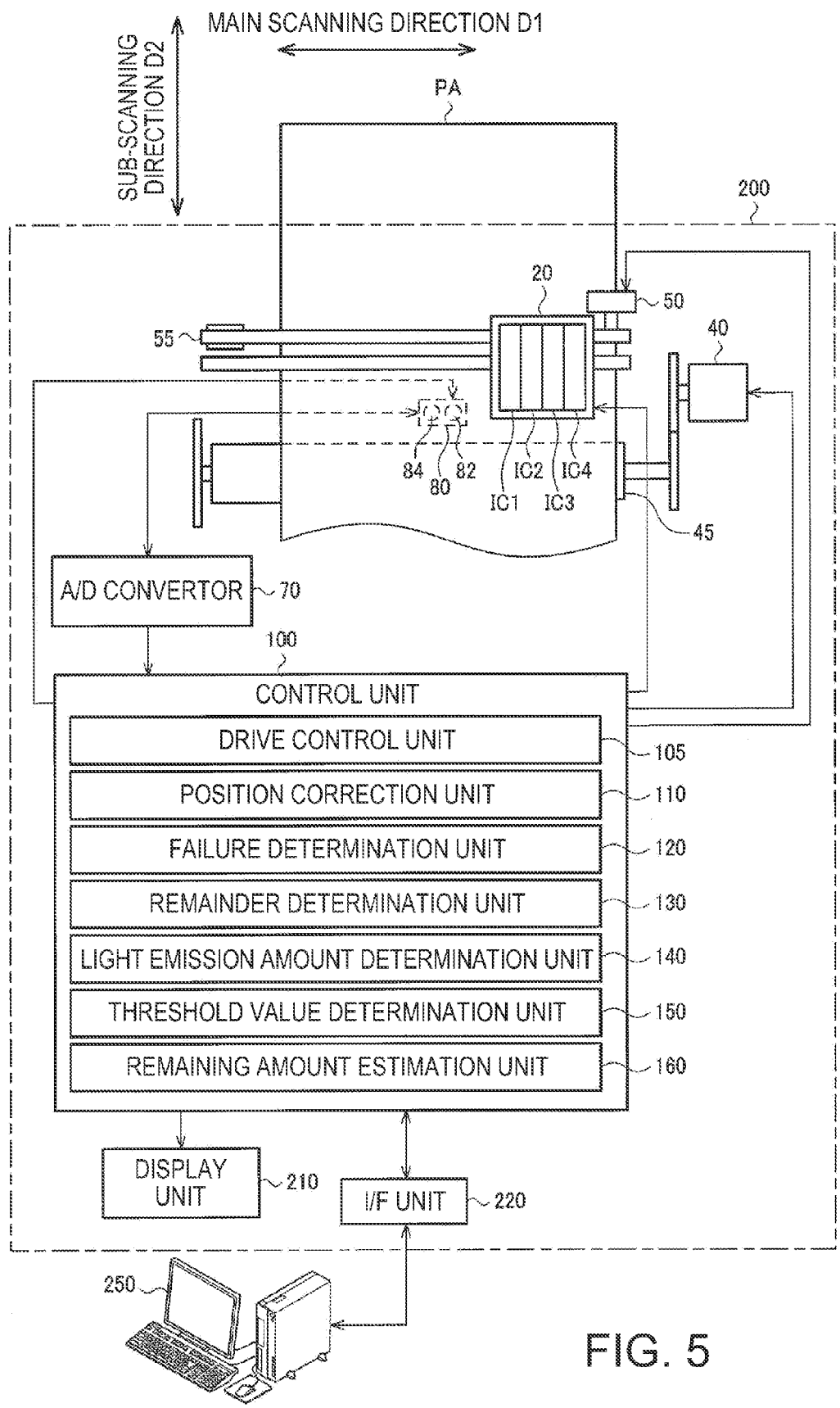
FIG. 5 shows an exemplary detailed configuration of the printer according to the present embodiment.

FIG. 5 shows an exemplary detailed configuration of the printer according to the present embodiment. In FIG. 5, a first direction D1 is the main scanning direction, and a second direction D2 that is orthogonal to the first direction D1 is the sub-scanning direction. Note that the following description will take an exemplary case where a light reception result signal output by the photosensor 80 is a voltage signal (hereinafter referred to as detection voltage), as indicated in FIG. 2.

The printer 200 in FIG. 5 includes the ink cartridges IC1 to IC4, the carriage 20 provided with the holder 21 that attachably and detachably holds the ink cartridges IC1 to IC4, the paper feed motor 40, the paper feed roller 45, the carriage motor 50, the carriage drive belt 55, the A/D convertor 70, the photosensor 80, the control unit 100, the display unit 210, and an interface unit 220. Note that the same constituent elements as those described in FIG. 1 will be given the same reference numerals, and a description thereof will be omitted as appropriate.

The A/D converter 70 performs A/D conversion on the detection voltage from the photosensor 80, and outputs a digital signal obtained after the A/D conversion to the control unit 100. Specifically, the A/D convertor 70 samples the detection voltage at predetermined position intervals corresponding to a count value of a rotary encoder that detects the position of the carriage with respect to the home position of the carriage when the carriage 20 is moved with respect to the photosensor, an interrupt cycle of a CPU constituting the control unit 100, or the like, and acquires a plurality of sampling voltages. For example, several dozens of sampling voltages are acquired when one cartridge passes above the photosensor 80.

The control unit 100 receives image data from a personal computer 250 via the interface unit 220, and performs control for printing the image on printing paper PA. The control unit 100 includes a drive control unit 105, a position correction unit 110, a failure determination unit 120, a remainder determination unit 130, a light emission amount determination unit 140, a threshold value determination unit 150, and the remaining amount estimation unit 160. The control unit 100 has a CPU, for example, deploys a control program stored in a ROM (not shown) into a RAM (not shown), and operates as each part of the control unit 100 by the CPU executing the control program deployed in the RAM.

The drive control unit 105 controls a drive unit in the printer 200. Specifically, the drive control unit 105 controls the carriage motor 50, which is a drive unit. It controls the carriage motor 50 and moves the carriage 20. The holder 21 and the head 22 included in the carriage 20 are thereby driven to move by the carriage motor 50.

The position correction unit 110 corrects position information of the carriage 20 in the main scanning direction D1, based on the sampled detection voltage. The position needs to be corrected due to attachment tolerance of the carriage 20 or the like. The position correction unit 110 corrects, based on the actual detection voltage, a shift of the carriage position (referred to as the prism center position) at which the center of the photosensor coincides with the center of the prism when remaining ink detection is performed, from the designed center position. Specifically, peak detection is performed on the detection voltage of each ink cartridge, and the prism center position at the time of performing the remaining ink detection is corrected based on the detected peak position.

The position of the carriage 20 is perceived based on the output of the rotary encoder carried in the carriage motor 50. That is to say, the rotary encoder outputs a count value corresponding to the amount of movement from the home position of the carriage 20, which is deemed to be a reference position, for example. A predetermined count value of the rotary encoder corresponds to the center position of the prism in each ink cartridge. Prior to the position correction, the count value corresponding to each of these positions is mechanically set based on a design value, and is stored in the ROM (not shown) in the control unit 100, for example. The position correction unit 110 corrects the count value corresponding to each position by means of the aforementioned correction processing, and writes the corrected count value or the amount of the shift from the designed center position in the RAM (not shown).

The failure determination unit 120 detects a factor that adversely affects the processing using the photosensor 80, such as a failure of the photosensor 80 or the presence of ambient light, based on the detection voltage sampled by the A/D convertor 70. The details of the processing performed by the failure determination unit 120 will be described later.

The remainder determination unit 130 determines whether or not each ink cartridge is in an ink near-end state, based on the detection voltage sampled by the A/D convertor 70. Regarding an ink cartridge that is in an ink near-end state according to the determination, the control unit 100 outputs an instruction to display an alarm for notifying a user of ink replacement on the display unit 210 of the printer 200 or a display unit of the personal computer 250 connected to the printer, for example, and prompts the user to replace the ink cartridge. For example, when it is determined by the remainder determination unit 130 that an ink cartridge is in an ink near-end state, the control unit 100 determines that the ink cartridge is empty if the remaining amount estimation unit 160 estimates that a predetermined amount of ink has been consumed after it is determined that the ink cartridge is in an ink near-end state, and does not execute printing until the ink cartridge is replaced. Alternatively, a configuration may also be employed in which the control unit 100 determines that the ink cartridge is empty if it is determined by the remainder determination unit 130 that the ink cartridge is in an ink near-end state, and does not execute printing until the ink cartridge is replaced.

The light emission amount determination unit 140 performs processing for determining the amount of the light emitted by the light-emitting portion 82, based on the detection voltage after being subjected to A/D conversion and a result of determination of whether or not an air bubble is present. The control unit 100 controls the PWM signal in FIG. 2 based on the determined amount of the emitted light, and controls the amount of the light emitted by the light-emitting portion 82. This light emission amount determination processing is performed together with later-described threshold value determination processing prior to the ink near-end detection, and the ink near-end detection is performed using the adjusted amount of the emitted light.

The remaining amount estimation unit 160 estimates the remaining amount of the ink in each ink cartridge by means of the dot count (also called soft count). Specifically, the remaining amount estimation unit 160 counts the number of ink droplets ejected from the print head, and calculates the amount of the used ink by multiplying the counted number of ink droplets by the mass per ink droplet. The remaining amount estimation unit 160 then estimates the amount of the remaining ink by subtracting the calculated amount of the used ink from the amount of the ink that is initially loaded in each ink cartridge. The remaining amount estimation unit 160 records the remaining amount of the ink that is thus estimated in the storage device 352 provided in each ink cartridge as appropriate. For example, when the printer 200 is started, the remaining amount estimation unit 160 acquires the remaining amount of the ink from the storage device 352 in each ink cartridge, stores it in the RAM (not shown) in the control unit 100, and updates this value in the RAM in conjunction with execution of printing and cleaning of the print head while the power is turned on. Then, for example, the remaining amount estimation unit 160 writes back the updated estimated remaining amount in the storage device 352 in each ink cartridge when the printer 200 is powered off, or when each ink cartridge is replaced, or every time a predetermined amount of ink is consumed. Note that, although the following description will take an exemplary case of estimating the remaining amount of the ink, the present embodiment is not limited thereto. For example, various kinds of ink amount, such as the amount of consumed ink, may be estimated.

The threshold value determination unit 150 sets, based on the sampled detection voltage, a threshold value for distinguishing between the detection voltage with which it is determined that the ink remains and the detection voltage with which it is determined that the ink cartridge is in an ink near-end state. Since the prism center position at the time of detecting an ink near-end state is accurately corrected by the position correction unit 110, a more appropriate threshold value can be set, and the accuracy of the ink near-end detection can be improved.

4. Ink Near-End Detection Technique

Next, an ink near-end detection technique will be described. FIGS. 6 and 7 are cross-sectional views in a YZ plane that passes through the prism 320 in an ink cartridge IC. FIGS. 6 and 7 show a state where the positional relationship between the prism 320 and the photosensor 80 is a positional relationship with which an ink near-end state can be detected.

Figure 6:
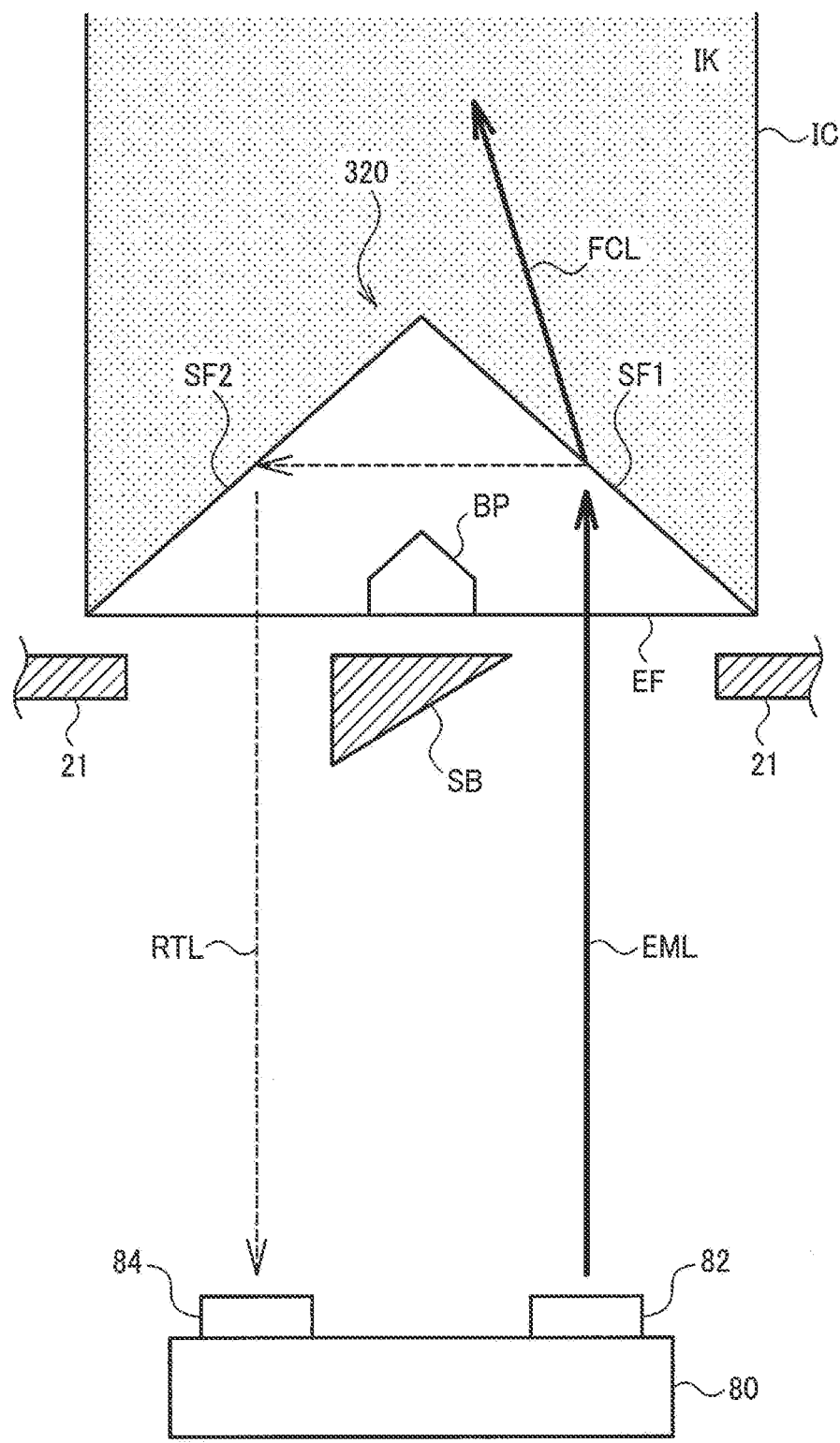
FIG. 6 is a diagram illustrating an ink near-end determination technique.
Figure 7:
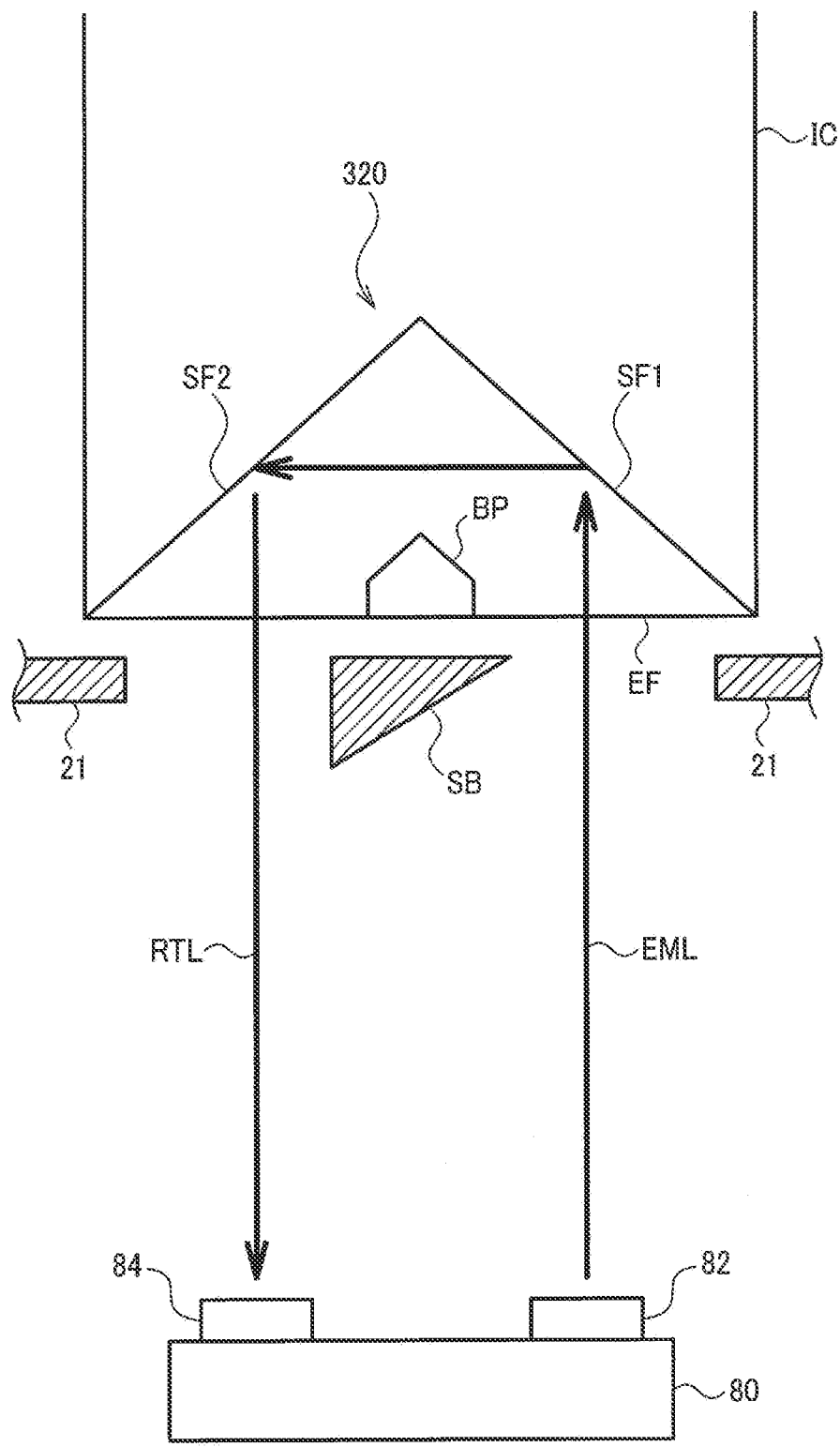
FIG. 7 is a diagram illustrating the ink near-end determination technique.

As shown in FIG. 6, an incident face EF of the prism 320 is provided with a cavity portion BP in order to suppress deformation that occurs when the prism 320 is formed. Openings are provided in the holder 21 and are configured such that the incident face EF faces the photosensor 80 through the openings when the ink cartridge IC is installed in the holder 21. The inclined faces SF1 and SF2 of the prism 320 face inward of the ink containing portion 300. When the ink containing portion 300 is filled with the ink IK, the inclined faces SF1 and SF2 come into contact with the ink IK. The inclined face SF1 is a face orthogonal to the inclined face SF2, for example, and the inclined face SF1 and the inclined face SF2 are arranged so as to be symmetric with respect to a plane parallel with an XZ plane in FIG. 1.

When the ink cartridge IC is filled with the ink IK, the light EML that enters the prism 320 from the light-emitting portion 82 passes through the opening of the holder 21 and enters the ink IK from the inclined face SF1 (light FCL). In this case, the amount of the light RTL reflected at the inclined faces SF1 and SF2 is very small, and accordingly the light-receiving portion 84 hardly receives the light. For example, assuming that the refractive index of the ink is 1.5, which is almost similar to the refractive index of water, if the prism 320 is made of polypropylene, the critical angle of total reflection at the inclined faces SF1 and SF2 is approximately 64 degrees. Since the incident angle is 45 degrees, total reflection of the light does not occur at the inclined faces SF1 and SF2, and the incident light EML enters the ink IK.

Next, the case will be considered where the ink IK in the ink cartridge IC is consumed for printing and the ink cartridge IC is not filled with the ink IK, as shown in FIG. 7. Assume that at least a portion of the inclined faces SF1 and SF2 of the prism 320 to which the light from the light-emitting portion 82 is radiated is in contact with the air. In this case, the light EML that enters the prism 320 from the light-emitting portion 82 is totally reflected at the inclined faces SF1 and SF2, and again exits to the outside of the prism 320 from the incident face EF (light RTL). Since the light-receiving portion 84 receives the totally reflected light RTL, strong detection voltage is obtained. For example, when the refractive index of the air is 1 and the prism 320 is made of polypropylene, the critical angle of total reflection at the inclined faces SF1 and SF2 is approximately 43 degrees. Since the incident angle is 45 degrees, the incident light EML is totally reflected at the inclined faces SF1 and SF2.

Next, FIG. 8 shows an exemplary characteristic of the detection voltage when one ink cartridge IC passes above the photosensor 80. The horizontal axis in FIG. 8 indicates a relative position between the prism 320 and the photosensor 80, and the position at which the center of the prism 320 coincides with the center of the photosensor 80 (e.g., the positional relationship between the ink cartridge IC and the photosensor 80 shown in FIG. 6) is "0". Note that the center of the photosensor 80 is the center between the light-emitting portion 82 and the light-receiving portion 84 in the main scanning direction. The vertical axis indicates detection voltage that is output from the photosensor 80 at each position on the horizontal axis.

As shown in FIG. 8, the closer the amount of the light received by the light-receiving portion 84 is to zero, the closer the detection voltage is to the upper limit voltage Vmax. Also, the larger the amount of the light received by the light-receiving portion 84 is, the closer the detection voltage is to the lower limit value Vmin. When the amount of the received light exceeds a predetermined value, the detection voltage is saturated and reaches the lower limit voltage Vmin. The upper limit voltage Vmax and the lower limit voltage Vmin correspond respectively to upper limit voltage and lower limit voltage in the range of voltage that the light-receiving portion 84 shown in FIG. 2 outputs to a collector terminal, for example.

As shown in FIG. 8, the detection voltage changes in accordance with the relative position between the photosensor 80 and the prism 320. SIK indicates a detection voltage characteristic in the case where the ink cartridge IC is filled with the ink IK, as described in FIG. 6. In this case, since the amount of the light received by the light-receiving portion 84 is small, the detection voltage is close to Vmax at the position "0". At positions PK1 AND PK2, each indicating the relative position between the center of the prism 320 and the center of the photosensor 80 shifted from the position "0" in the main scanning direction, peaks Spk1 and Spk2 occur due to the reflected light from the incident face EF of the prism. These peaks Spk1 and Spk2 will be described later in FIG. 9.

SEP indicates a detection voltage characteristic in the case where the ink cartridge IC is not filled with the ink IK, as described in FIG. 7. In this case, since the amount of the light received by the light-receiving portion 84 is large, the detection voltage reaches (or approaches) Vmin at the position "0". The characteristic of the detection voltage significantly differs in this manner depending on whether or not the ink cartridge IC is filled with the ink IK. In the present embodiment, an ink near-end state of each ink cartridge is detected by detecting this difference in the detection voltage characteristic.

Specifically, a threshold value Vth is set between a peak value Vpk1 of a detection voltage characteristic SIK and the lower limit voltage Vmin, based on the peak value Vpk1. If the detection voltage of the photosensor 80 is smaller than the threshold value Vth when in a detection range DPR in which the ink cartridge IC passes above the photosensor 80, it is determined that the ink cartridge IC is in an ink near-end state, and if the detection voltage is larger than or equal to the threshold value Vth, it is determined that the ink remains.

Figure 9:
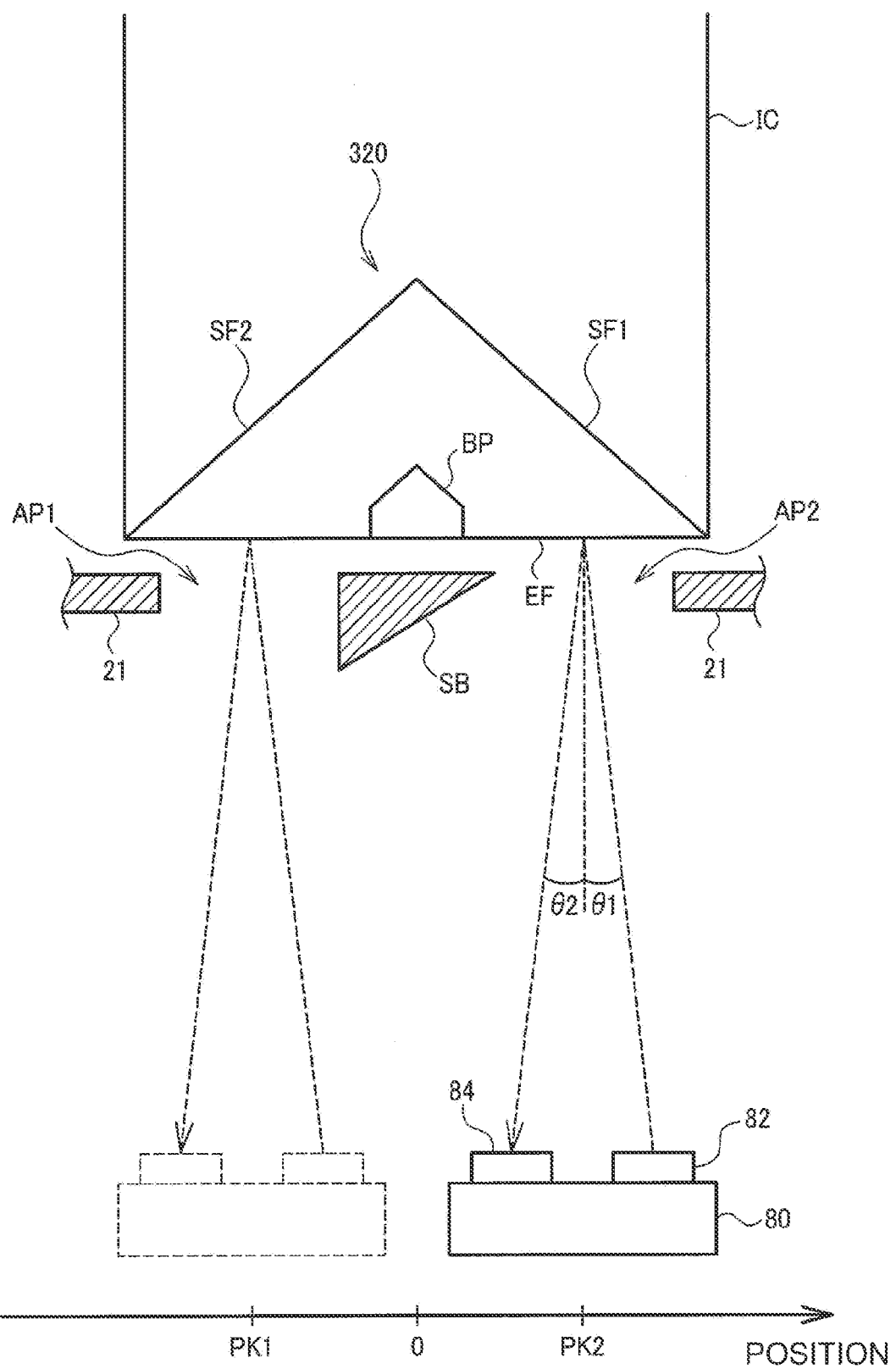
FIG. 9 is a diagram illustrating a peak generated due to reflected light from a prism incident face.

Next, the peaks Spk1 and Spk2 will be described using FIG. 9. As shown in FIG. 9, the holder 21 is provided with openings so as to correspond to the respective prisms 320, and a light-blocking portion SB that blocks the light from the light-emitting portion 82 is provided at the center of each opening. The center of each opening is the position corresponding to the center of the corresponding prism 320 when the ink cartridge IC is installed in the holder 21. The light-blocking portion SB is provided so as to be aligned with a direction (the X direction) intersecting the main scanning direction (the ±Y direction), and divides the opening of the holder 21 into a first opening AP1 and a second opening AP2 that are arranged in the main scanning direction.

The light that enters the prism incident face EF from the light-emitting portion 82 is partially reflected and received by the light-receiving portion 84. That is to say, the light having an incident angle θ1 when entering the incident face EF from the light-emitting portion 82 and a reflecting angle θ2 when being reflected from the incident face EF toward the light-receiving portion 84, the incident angle θ1 being equal to the reflecting angle θ2, is received by the light-receiving portion 84. As indicated by the detection voltage characteristic SIK in FIG. 8, the reflected light from the incident face EF is not detected at the position "0" at which the center of the prism coincides with the center of the photosensor since the light-blocking portion SB exists. Meanwhile, at the positions PK1 and PK2, the openings AP1 and AP2 exist and accordingly the peaks Spk1 and Spk2 are detected. Here, the position PK1 is a position at which the center of the opening AP1 in the main scanning direction coincides with the center of the photosensor 80, and the position PK2 is the position at which the center of the opening AP2 in the main scanning direction coincides with the center of the photosensor 80. Accordingly, the center position of the prism that is corrected based on the detection voltage indicates the center between the center of the opening AP1 in the main scanning direction and the center of the opening AP2 in the main scanning direction. Note that although the reflected light from the incident face EF is also detected when totally reflected light returns from the prism 320, the peaks Spk1 and Spk2 are not generated since the detection voltage is buried in the signal of the totally reflected light, as indicated by a detection voltage characteristic SEP.

Figure 10:
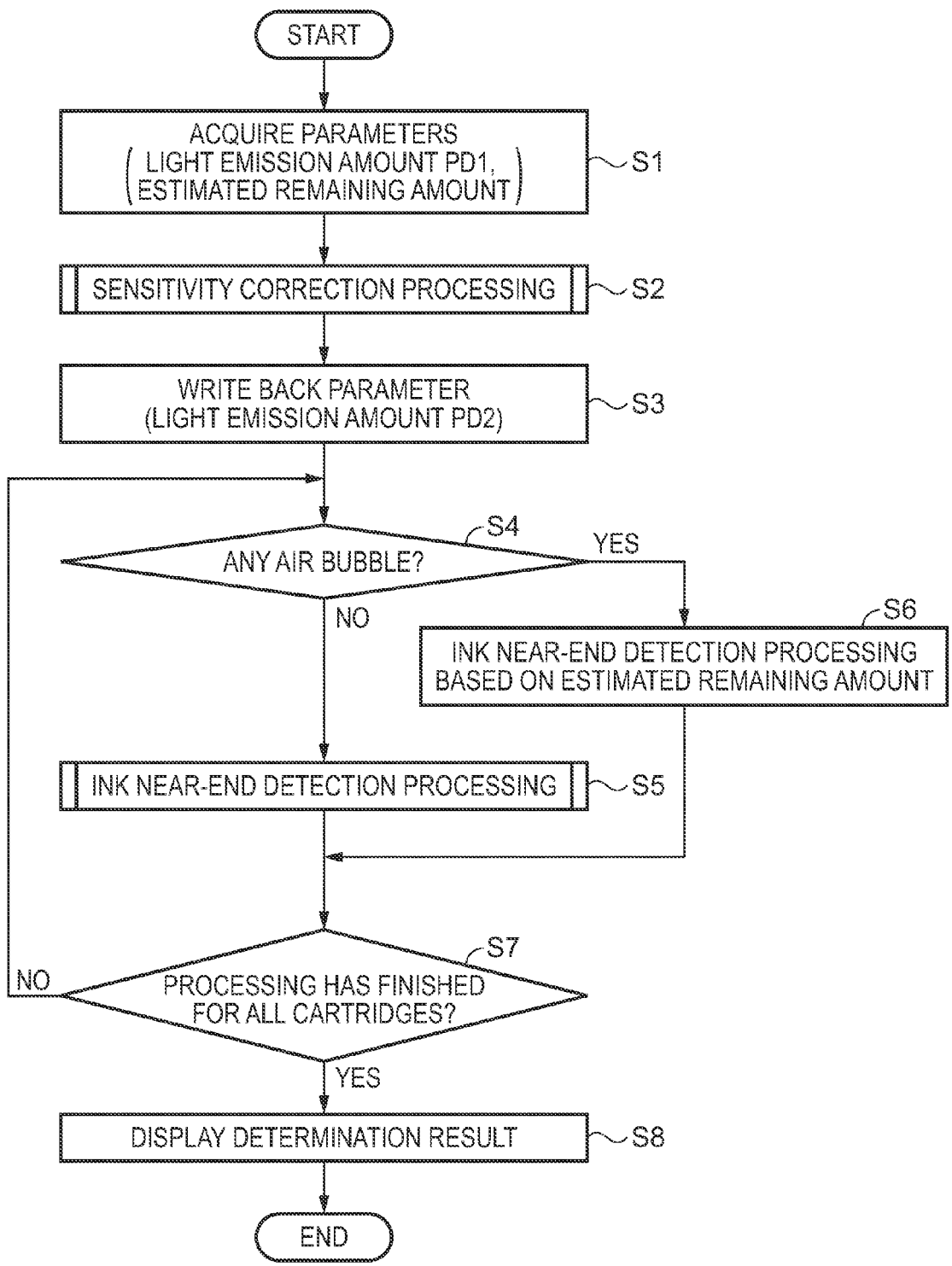
FIG. 10 is a flowchart of ink near-end detection processing.

FIG. 10 is a flowchart of an ink near-end detection processing executed by the control unit 100. Steps S1 to S3 (processing for setting parameters for ink near-end detection) in this flow are executed when the printer is powered on and when an ink cartridge is replaced, for example. Steps S4 to S8 (actual ink near-end detection processing) in this flow are executed when the printer is powered on and when an ink cartridge is replaced, for example, as well as during an interval between print jobs and at a predetermined timing during printing, for example.

As shown in FIG. 10, upon the processing being started, the control unit 100 acquires parameters used in the subsequent processing (step S1). Specifically, a light emission amount PD1 that is determined by the previous sensitivity correction processing, and the estimated remaining amount of the ink in each ink cartridge are acquired from the ROM or the RAM (not shown) in the control unit 100. The light emission amount PD1 is stored in the ROM in the control unit. The estimated remaining amount of the ink is read out from the storage device 352 in each ink cartridge and is stored in the RAM (not shown) in the control unit 100 when the printer 200 is powered on or when a cartridge is replaced. Accordingly, the control unit 100 can acquire the estimated remaining amount of the ink from its own RAM (not shown).

Next, the light emission amount determination unit 140 and the threshold value determination unit 150 execute the sensitivity correction processing (step S2). In the sensitivity correction processing, processing for determining a light emission amount PD2 that is used in the ink near-end detection processing in step S5 and processing for determining a threshold value for the ink near-end detection are performed. The sensitivity correction processing includes the position correction processing performed by the position correction unit 110.

Specifically, the peaks Spk1 and Spk2 of the detection voltage of each ink cartridge are obtained by moving the carriage above the photosensor while causing the photosensor to emit light by the light emission amount PD1, and the light emission amount determination unit 140 selects the smallest peak voltage of these peaks (the smallest of V_F_min of each ink cartridge). Then, the amount of the light emitted by the light-emitting portion 82 is adjusted such that the smallest peak voltage is within a predetermined voltage range. The amount of the emitted light is adjusted by adjusting the duty of a PWM waveform that controls the amount of the emitted light, based on the ratio between the smallest peak voltage and a predetermined voltage.

Also, two peak voltages are obtained for each ink cartridge, the smaller peak voltage thereof is obtained as V_F_min, and the threshold value determination unit 150 sets $\alpha$ and $\beta$ respectively as a predetermined coefficient and a predetermined offset value, and obtains the determination threshold value based on Vth=V_F_min×$\alpha$+$\beta$. $\alpha$ and $\beta$ may be set by considering the S/N ratio of the detection voltage. The threshold value determination unit 150 obtains threshold values VthIC1 to VthIC4 for the ink cartridges IC1 to IC4, respectively.

Next, the control unit 100 writes back a new parameter determined in the sensitivity correction processing, i.e., a new light emission amount PD2 in the ROM in the control unit (step S3).

Next, the remainder determination unit 130 reads out a result of air bubble presence determination from the RAM (not shown) in the control unit 100 (step S4). Although the details of the air bubble presence determination will be omitted, if an air bubble is attached, the prism 320 comes into contact with the air even if the ink cartridge is filled with the ink IK. Therefore, there is a possibility that a part of the incident light is totally reflected, resulting in a reduction in the accuracy of the remaining status determination using the photosensor 80. Accordingly, during the sensitivity correction processing, it is determined based on the detection voltage whether or not an air bubble is present, and a result thereof is written in the RAM. The content of the ink near-end detection processing is changed when an air bubble is present and when not present. However, various modifications of the ink near-end detection processing are possible. For example, the air bubble presence determination may be omitted.

In the example in FIG. 10, if an air bubble is not present in a processing target ink cartridge, the remainder determination unit 130 performs the ink near-end detection processing for this ink cartridge (step S5). In this processing, an ink near-end state is determined based on the threshold determination on the detection voltage using the threshold value determined in the sensitivity correction processing, and on the determination of whether or not the estimated remaining amount has reached a predetermined value. The details of the ink near-end detection processing will be described later in FIG. 11. If an air bubble is present in the processing target ink cartridge in step S4, an ink near-end state is detected based on the remaining amount of the ink estimated by the remaining amount estimation unit 160 (step S6). For example, in this detection processing, processing similar to that in steps S45 to S48 in later-described FIG. 11 is performed.

Next, it is determined whether or not the ink near-end detection processing has finished for all ink cartridges IC1 to IC4 (step S7), and if not, the next ink cartridge is set as the processing target, and step S4 is executed again. If the ink near-end detection processing has finished for all ink cartridges, processing for displaying a determination result on the display unit 210 is performed (step S8), and the processing of this flow ends.

Figure 11:
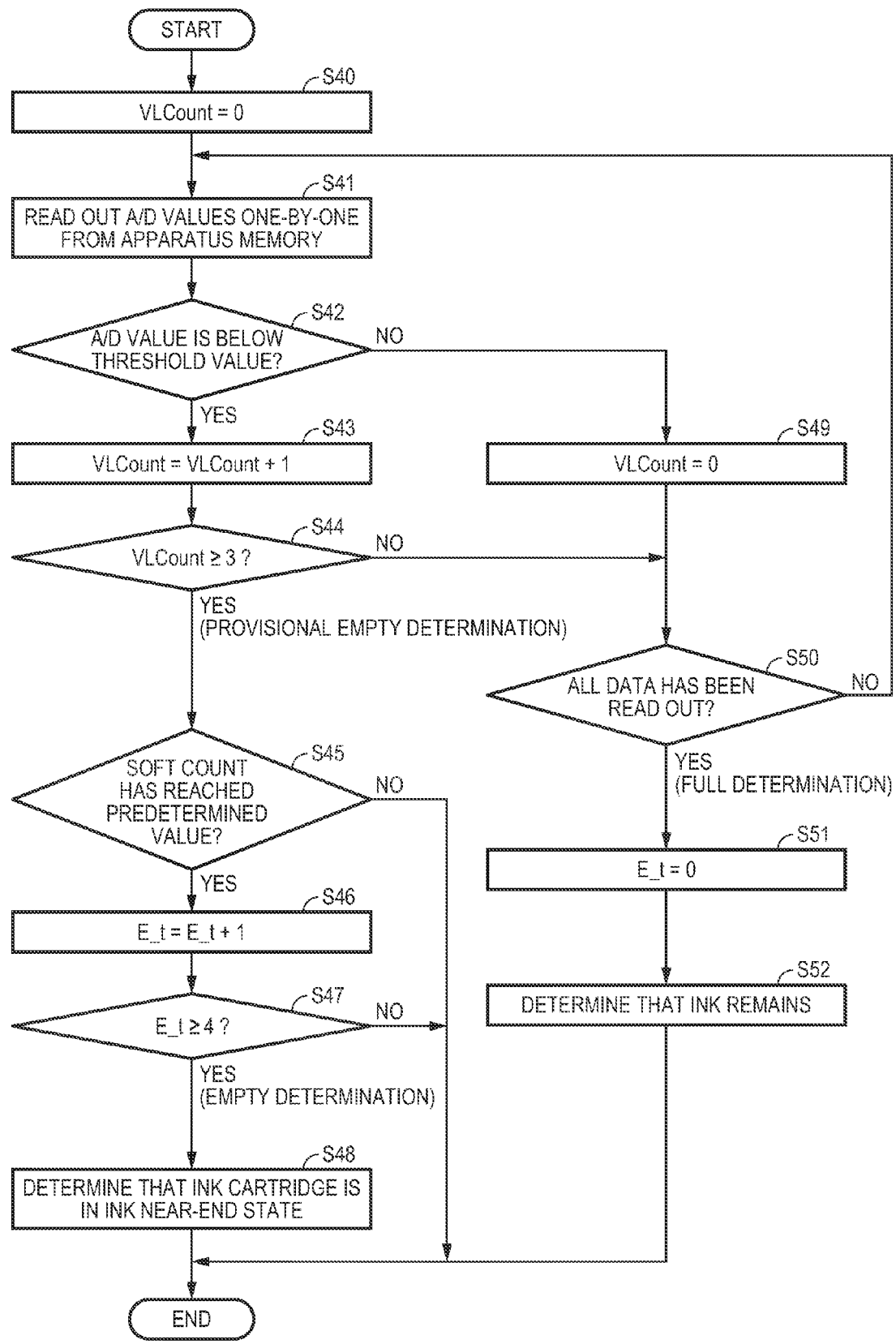
FIG. 11 is a detailed flowchart of the ink near-end detection processing.

FIG. 11 is a detailed flowchart of the ink near-end detection processing. Upon this processing being started, the control unit 100 measures the detection voltage by the light emission amount PD2 determined in step S2, the A/D convertor 70 acquires sampling voltages, and the control unit 100 stores, among the sampling voltages, a voltage within the detection range DPR of each cartridge in the RAM (not shown). The remainder determination unit 130 clears the count value VLCount for the threshold determination to "0" (step S40). Next, A/D conversion values of the detection voltage of the processing target ink cartridge (the ink cartridge IC1 will be taken as an example in the following description) that are stored in the RAM (not shown) are read out one-by-one in order of storage (step S41).

Next, the remainder determination unit 130 determines whether or not each A/D conversion value is smaller than a determination threshold value VthIC1 of the ink cartridge IC1 that is obtained in the sensitivity correction processing (step S42). If it is determined that the A/D conversion value is smaller than the determination threshold value, the count value VLCount is incremented (step S43). Next, it is determined whether or not the count value VLCount is 3 or larger (step S44). That is to say, it is determined whether or not three or more of the sampled detection voltages are below the threshold value in the detection area of the ink cartridge IC1. If the count value VLCount is 3 or larger, provisional empty determination (provisional ink near-end determination) is made.

The provisional empty determination is made if the count value VLCount is 3 or larger because, although the ink cartridge actually is not in an ink near-end state, the A/D conversion value may possibly fall below the threshold value due to sudden noise caused by static electricity, for example.

If the provisional empty determination is made, the remainder determination unit 130 determines whether or not the estimated remaining amount (a soft count value, a dot count value) of the ink is smaller than a predetermined value (step S45). Here, the predetermined value indicates the estimated remaining amount of the ink with which the actual remaining amount in the cartridge does not enter an ink near-end state, taking into consideration the tolerance of the printer and the ink cartridge and the use environment. If the estimated remaining amount of the ink is not smaller than the predetermined value, it is not determined that the ink remains or the cartridge is in an ink near-end state, and the processing ends. If the estimated remaining amount of the ink is smaller than the predetermined value, the count value E_t for the provisional empty determination is incremented (step S46). The count value E_t is a count value that is incremented when it is determined for each ink cartridge that the ink does not remain in the ink near-end detection processing in step S5 and the estimated remaining amount of the ink at this time is smaller than the predetermined value. Next, the remainder determination unit 130 determines whether or not the count value E_t is 4 or larger (step S47). If E_t is not 4 or larger, it is not determined that the ink cartridge is in an ink near-end state, and the processing ends. If E_t is 4 or larger, it is determined that the ink cartridge is in an ink near-end state (step S48), and the processing ends.

In step S42, if it is determined that the A/D conversion value is not smaller than the determination threshold value, the count value VLCount is cleared to "0" (step S49). Next, it is determined whether or not all A/D conversion values stored in the RAM (not shown) in the control unit 100 have been read out (step S50). If there is an A/D conversion value that has not been read out, the processing returns to step S41. If all A/D conversion values have been read out, the count value E_t for the provisional empty determination is cleared to "0" (step S51), it is determined that the ink remains (step S52), and the processing ends.

5. Photosensor Failure Detection Technique

Figure 12:
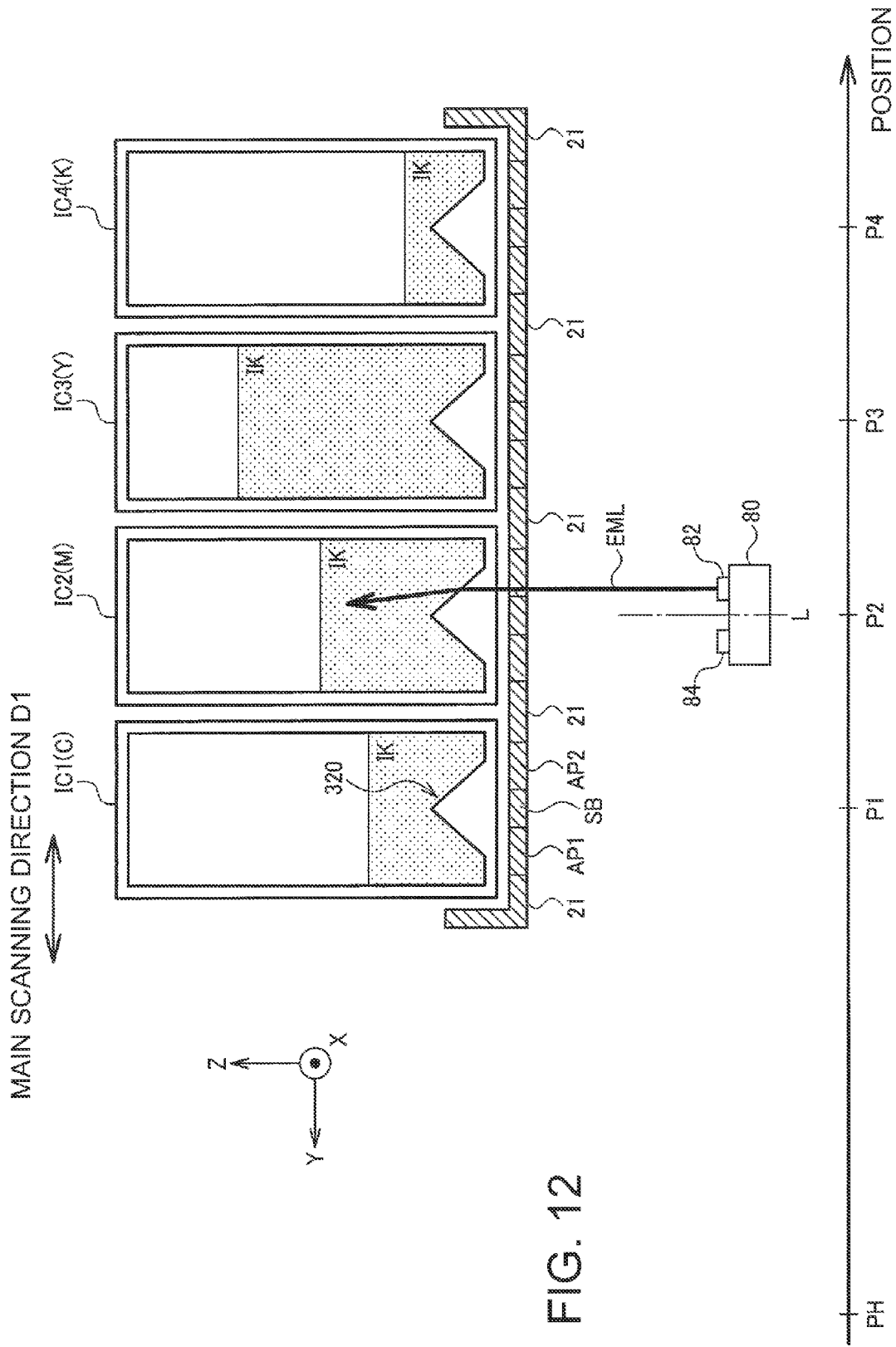
FIG. 12 is a diagram illustrating a relative positional relationship between a carriage and the photosensor.

Next, the technique of detecting a failure of the photosensor 80 in the present embodiment will be described. FIG. 12 is a conceptual diagram showing a relative positional relationship between the photosensor 80 and the carriage 20 when the carriage 20 has moved in the main scanning direction D1 from the home position PH. Positions P4 to P1 are positions at which the respective prisms in the ink cartridges IC1 to IC4 are irradiated with the light from the light-emitting portion 82.

Figure 13A:
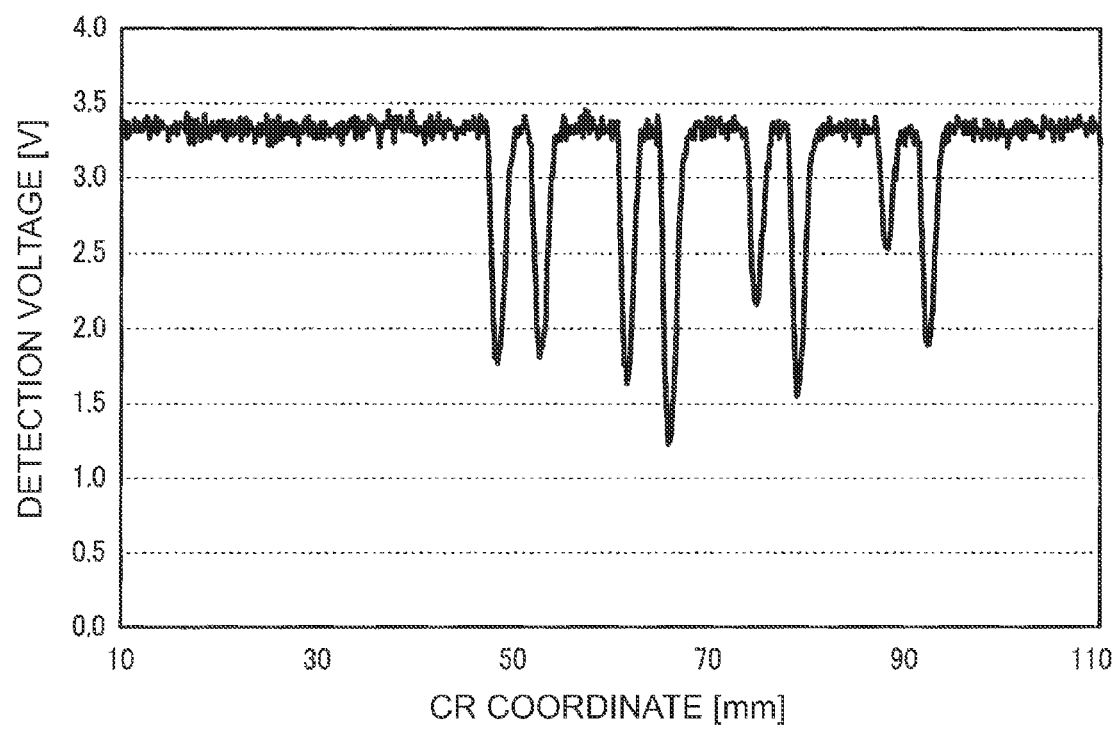
FIGS. 13A and 13B show exemplary waveforms in the case of causing a light-emitting portion to emit light.
Figure 13B:
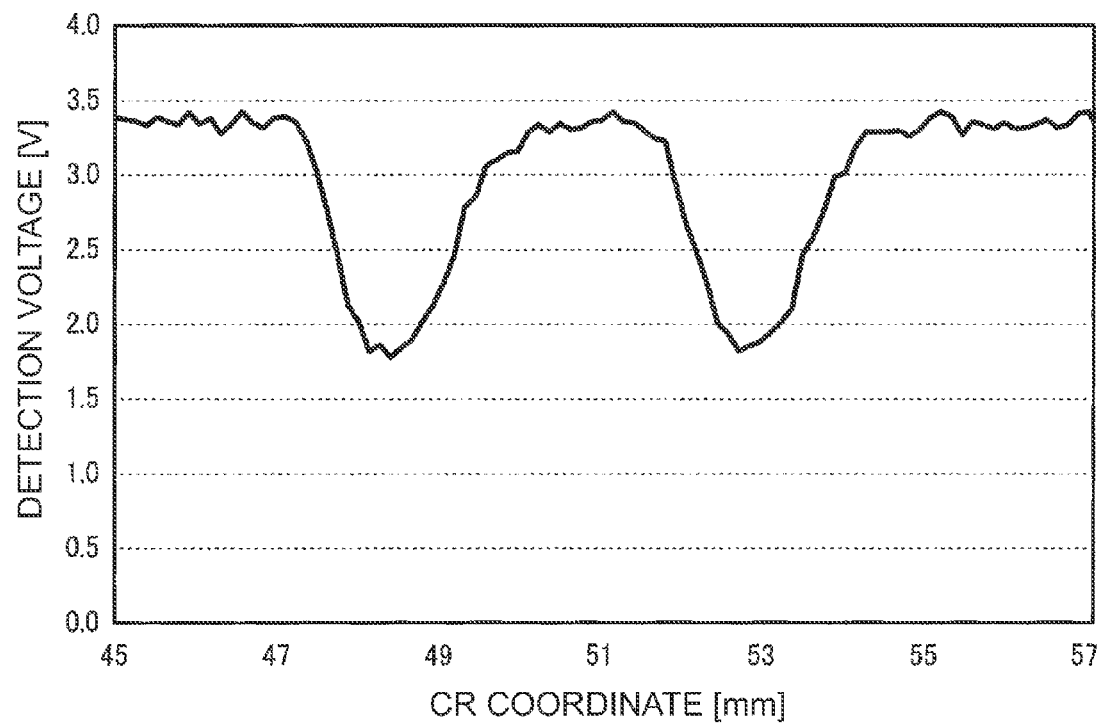

As a result of the carriage 20 moving in the main scanning direction D1 from the home position PH, the detection signal at the light-receiving portion 84 is acquired while the relative positional relationship between the photosensor 80 and the respective ink cartridges IC1 to IC4 is changed. It is assumed that the failure detection in the present embodiment is performed in a state where the ink cartridges are filled with ink IK. Accordingly, when the light-emitting portion 82 is emitting light, a waveform in which the two peaks Spk1 and Spk2 appear is acquired for each ink cartridge, as indicated by SIK in FIG. 8. For this reason, when there are four ink cartridges as shown in FIG. 1 and the like, a waveform in which two peaks appear for each ink cartridge, i.e., a total of eight peaks appear is acquired as shown in FIG. 13A. FIG. 13B shows a waveform corresponding to one cartridge that is extracted from the waveform in FIG. 13A, and this extracted waveform corresponds to SIK in FIG. 8, as mentioned above. Note that the "CR coordinate" of the horizontal axis in FIGS. 13A, 13B, and later-described FIG. 14 refers to the coordinate that represents the position of the carriage 20 in the main scanning direction D1. The horizontal axis here is the CR coordinate since the carriage 20 moves. However, as in FIG. 8, the horizontal axis in FIGS. 13A to 14 can be extensively considered to be the relative position of the carriage 20 and the photosensor 80.

In the present embodiment, as mentioned above, a failure is detected by also using the detection signal in a state where the light of the light-emitting portion 82 is turned off. When the light of the light-emitting portion 82 is turned off, in an ideal state, the light is not detected regardless of the relative positional relationship between the ink cartridge and the photosensor 80. Accordingly, the output voltage (detection voltage) is equal to the power source voltage (power supply potential Vcc).

Figure 14:
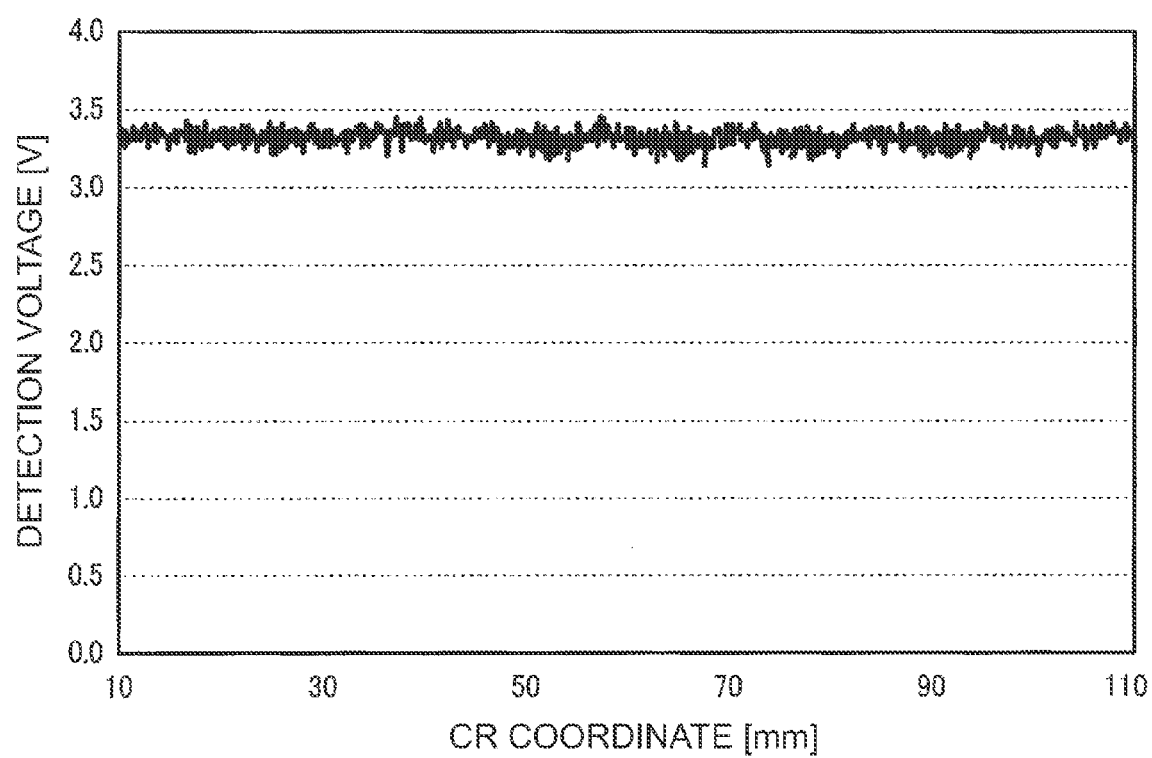
FIG. 14 is an exemplary waveform in the case of causing the light-emitting portion to turn off the light.

In the present embodiment, a signal such as one shown in FIG. 14 is acquired by causing the light-emitting portion 82 to turn off the light during one of the movement of the carriage 20 in a given direction (e.g., the +Y direction) and the movement in the opposite direction (the −Y direction), and a signal such as one shown in FIG. 13A is acquired by causing the light-emitting portion to emit light during the other one. The failure determination unit 120 detects a failure of the photosensor 80 based on these signals.

Specifically, in a normal state, a signal waveform in which the two peaks Spk1 and Spk2 are clear, as shown in FIG. 13A, is expected to be acquired for each ink cartridge when the light is emitted, and a signal waveform close to the power source voltage, as shown in FIG. 14, is expected to be acquired regardless of the position when the light is turned off. Accordingly, a failure need only be detected based on these signal waveforms. If a waveform close to that in FIG. 13A or 14 is acquired at the time of the failure detection processing, it can be determined that a failure or the like has not occurred, and if a waveform that is different from those in FIGS. 13A and 14 is acquired, it can be determined that a failure or the like has occurred. The specific technique of distinguishing between a normal state and an abnormal state (failure) will now be described, separately regarding the case of not taking into consideration leakage current generated due to the phototransistor of the light-receiving portion and the case of taking it into consideration.

5.1 Technique that does not Take Leakage Current into Consideration

A technique that does not take leakage current into consideration will be described first. Here, a description will be given of a technique of performing the processing for each ink cartridge when there are a plurality of ink cartridges. It may seem that it is not so necessary to perform processing regarding a failure of the photosensor 80 for each cartridge. However, regarding ambient light, it is considered that there are cases where it is helpful to give individual consideration to each ink cartridge, as in the case where ambient light enters at the time of the remaining status determination for the first ink cartridge, but does not enter at the time of the remaining status determination for the second ink cartridge.

Accordingly, the processing for one ink cartridge will be described below, and it is assumed that the failure detection according to the present embodiment is realized by repeating this processing for the number of ink cartridges.

In the technique in the present embodiment, the smallest value of the output voltage in an acquisition range of each ink cartridge is used. The "acquisition range" here refers to a range of the positional relationship in which the two peaks Spk1 and Spk2 can be sufficiently acquired for a target ink cartridge (in the narrow sense, a range in the main scanning direction D1), and may be a range of approximately ±6 mm from the center position of each ink cartridge, for example. Even if the two peaks are acquired for each ink cartridge, one of the peaks with lower output voltage (with a larger peak) need only be used in the processing. Each of the schematic diagrams in FIGS. 15A to 15D and the like, which are described below, shows one of the two peaks acquired for a given ink cartridge.

Figure 15A:
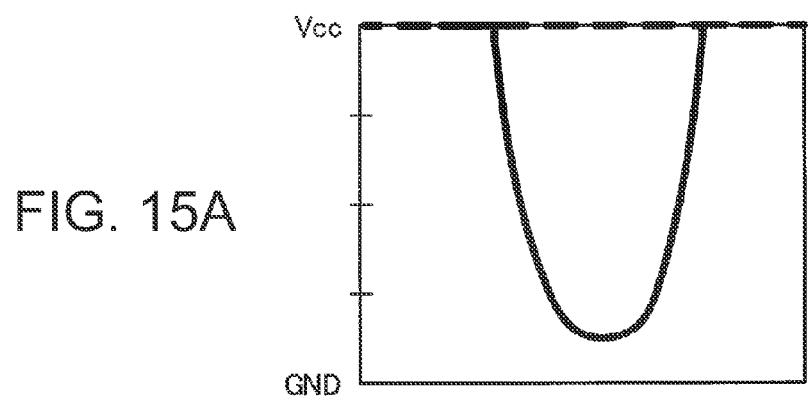
FIG. 15A is a schematic diagram showing a waveform in a normal state.

FIG. 15A is a schematic diagram of waveforms in a normal state. The horizontal axis in FIG. 15A indicates the position in the main scanning direction D1, and the vertical axis indicates the output voltage. The solid line in FIG. 15A corresponds to a waveform in the case of causing the light-emitting portion 82 to emit light, and the broken line corresponds to a waveform in the case of causing the light-emitting portion 82 to turn off the light. The same applies to FIGS. 15B to 15D and the like. As mentioned above, a value close to the power source voltage Vcc is output regardless of the position when the light of the light-emitting portion 82 is turned off. On the other hand, when the light is emitted, a state corresponding to the position of either PK1 or PK2 shown in FIG. 9 is achieved, and a peak is detected.

In the present embodiment, a failure of the photosensor 80 is initially detected by using the output voltage at the time of turning off the light. Specifically, the determination unit determines that the photosensor has failed if it is determined that detection current of the photosensor 80 in the case of causing the light-emitting portion 82 to turn off the light is larger than or equal to a first threshold value.

Here, a detection signal of the photosensor 80 may be expressed as current, or may be expressed as voltage, as mentioned above. That is to say, "the detection current being larger than or equal to the first threshold value" can be replaced with "the detection voltage being smaller than or equal to a first voltage threshold value Vth1". Also, in the narrow sense, the detection current of the photosensor 80 is the largest value of the detection current (the smallest value of the detection voltage) in the acquisition range.

Figure 15B:
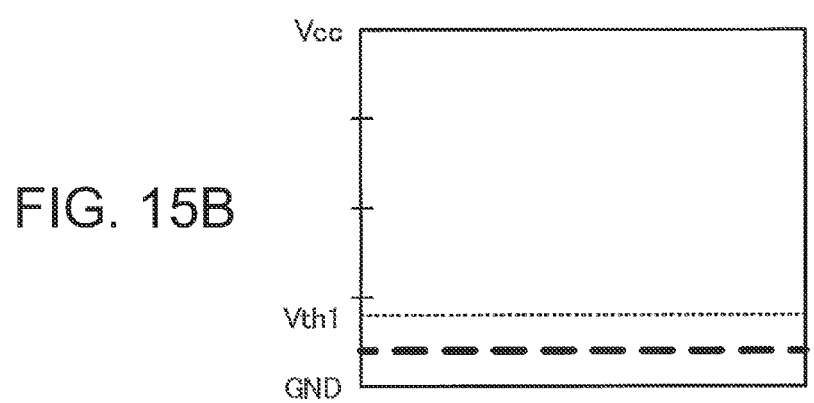
FIGS. 15B to 15D are schematic diagrams showing waveforms in the case where a failure or the like has occurred.

FIG. 15B is the schematic diagram in this case. In this diagram, although the output voltage at the time of causing the light-emitting portion 82 to turn off the light is to be a value close to Vcc as shown in FIG. 15A, the output voltage value is small (in the narrow sense, the output voltage value is close to the ground potential GND). In the case in FIG. 15B, excessive current that originally is not to flow is flowing, and it is estimated that a ground shorting error has occurred. Specifically, there is a possibility that an element constituting the light-receiving portion 84, such as a photodiode, is in a conductive state due to a failure of this element, or a possibility that an output terminal is connected to the ground due to an error in the circuit configuration.

In the present embodiment, a failure is detected using a difference value between the output voltage at the time of turning off the light and the output voltage at the time of emitting light. Specifically, the determination unit determines that the photosensor 80 has failed if the difference value between the detection signal level of the photosensor 80 in the case of causing the light-emitting portion 82 to emit light and the detection signal level of the photosensor 80 in the case of causing the light-emitting portion 82 to turn off the light is smaller than or equal to a second threshold value.

As mentioned above, the difference in the detection signal level may be a difference in the current value, or may be a difference in the voltage value. The output voltage at the time of emitting light contains a component of the light radiated from the light-emitting portion 82, whereas the output voltage at the time of turning off the light does not contain a component of the light radiated from the light-emitting portion 82. On the other hand, the light or a signal caused due to a factor other than the light-emitting portion 82 is considered to be detected regardless of whether the light-emitting portion 82 emits light or the light thereof is turned off. That is to say, it is possible to suppress the influence of other light or signal and extract a signal component generated due to the light-emitting portion 82 by obtaining the difference between when the light is emitted and when the light is turned off.

Figure 15C:
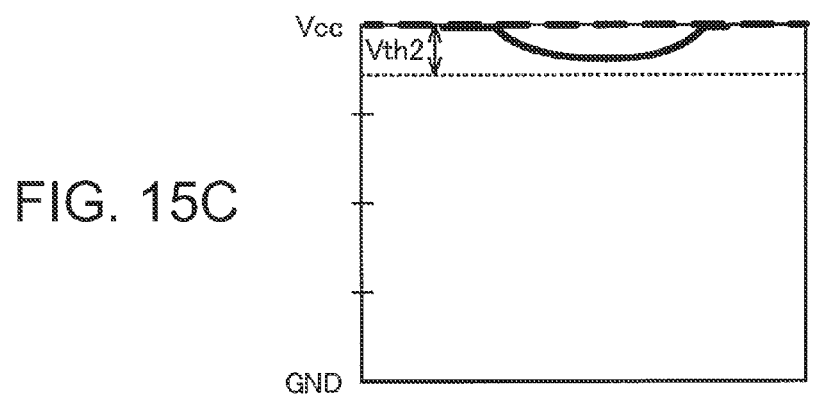

FIG. 15C is the schematic diagram in the case where the difference in the detection signal level is smaller than or equal to the threshold value. In terms of voltage, the voltage drop width at the time of emitting light is smaller than that in a normal state shown in FIG. 15A. The signal (Vpk1 in FIG. 8) used here and the signal (Vmin in FIG. 6) used in the liquid remaining status determination are different in that the reflecting face at the prism 320 is EF or SF1 and SF2, but are similar to each other in that they are obtained from the light that is emitted by the light-emitting portion 82, reflected at the prism 320, and received by the light-receiving portion 84. That is to say, if the light from the light-emitting portion 82 is detected but the level of the detection signal generated due to this light is small, the accuracy of the remaining status determination will be low. Also, a signal caused due to the light-emitting portion 82 is used in the processing, similarly at the time of the sensitivity correction and the position correction.

Accordingly, in the present embodiment, it is determined in the case shown in FIG. 15C that a failure in light emission by the light-emitting portion 82 or a failure of significantly low light reception sensitivity of the light-receiving portion 84 has occurred.

Also, in the present embodiment, if a failure is not detected in the above processing, ambient light determination is performed using a difference value between the output voltage at the time of turning off the light and a given reference voltage. Specifically, the determination unit determines that ambient light is present if a failure of the photosensor 80 is not detected, and the difference value between the detection signal level of the photosensor 80 in the case of causing the light-emitting portion 82 to turn off the light and the given reference level is larger than or equal to the third threshold value.

Figure 15D:
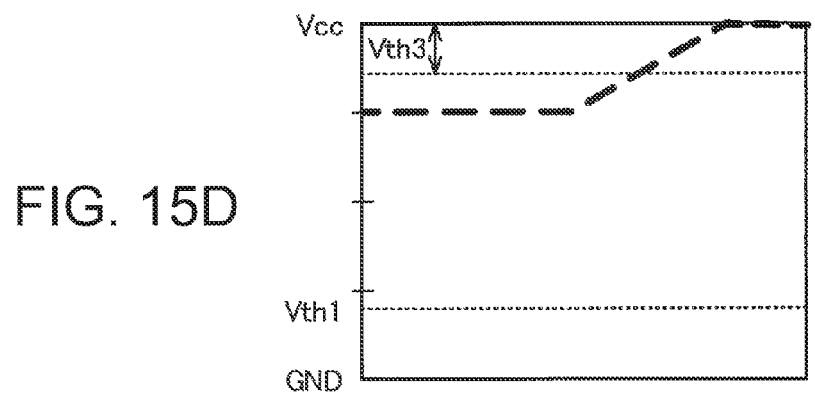

As mentioned above, if the light of the light-emitting portion 82 is turned off, ideally no light is detected, the value of flowing current is zero, the voltage drop is also 0, and the output voltage is Vcc. That is to say, if the output voltage at the time of turning off the light is lower than Vcc, it can be estimated that this is because ambient light enters. FIG. 15D is a schematic diagram in this case. Note that FIGS. 16A and 16B are schematic diagrams respectively corresponding to two different states of the relative positional relationship between the carriage 20 and the photosensor 80 in the case of causing the light-emitting portion 82 to turn off the light and in the case of causing the light-emitting portion 82 to emit light. As shown in FIG. 16B, when the carriage 20 is located above the photosensor 80, it is considered that ambient light is blocked by the carriage 20 and accordingly does not enter the light-receiving portion 84. "Ig" in FIGS. 16A and 16B represents current generated due to ambient light, and "Ic" represents current generated due to the reflected light of the light from the light-emitting portion. In FIG. 15D, the drop width of the voltage value is small in the range where the value on the horizontal axis is large even in the case where ambient light is present, and this expresses the blocking by the carriage 20.

In the liquid remaining status determination, a threshold value for the remaining status determination is set between Vpk1 and Vmin in FIG. 8. For this reason, if Vpk1 decreases due to the influence of ambient light, the setting of the threshold value becomes severe, and there is also a possibility that a small error leads to incorrect determination in the remaining status determination. Accordingly, in the present embodiment, if the voltage drops by a given voltage threshold value Vth3 or larger with respect to Vcc, it is determined that ambient light at the level that affects other determination enters.

Figure 17:
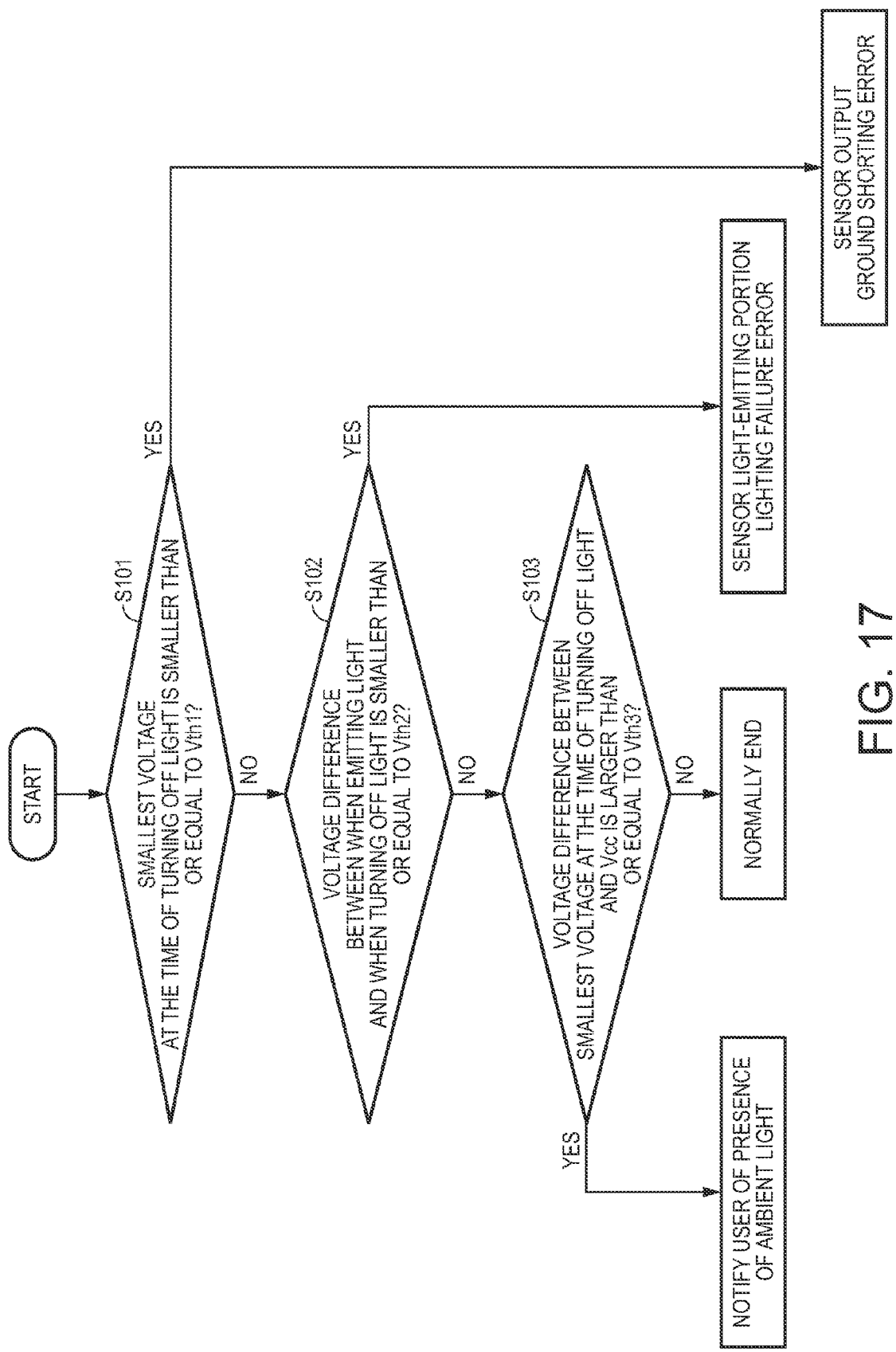
FIG. 17 is a flowchart of failure detection processing.

FIG. 17 is a flowchart simply showing the above processing. In the failure determination performed by the failure determination unit 120, the smallest voltage (the voltage corresponding to the peak Spk1 or Spk2) at the time of turning off the light is initially acquired, and this smallest voltage is compared with the first threshold value Vth1 (step S101). If the smallest voltage is smaller than or equal to Vth1, it is determined that a ground shorting error has occurred, as shown in FIG. 15B.

If the smallest voltage is larger than Vth1, the voltage difference between when the light is emitted and when the light is turned off is compared with a second threshold value Vth2 (step S102). If the voltage difference is smaller or equal to than Vth2, it is determined that a failure in light emission by the light-emitting portion 82 has occurred, or that the sensitivity of the light-receiving portion 84 is insufficient, as shown in FIG. 15C.

In the case of No in step S102, i.e., if a failure is not detected, the voltage difference between the smallest voltage at the time of turning off the light and the power source voltage Vcc is compared with a third threshold value Vth3 (step S103). If the voltage difference is larger than or equal to Vth3, it is determined that ambient light enters, as shown in FIG. 15D. In the case of No in step S103 as well, it is deemed that the photosensor 80 has not failed and that there is no influence of ambient light or the like, and the processing normally ends.

Figure 18:
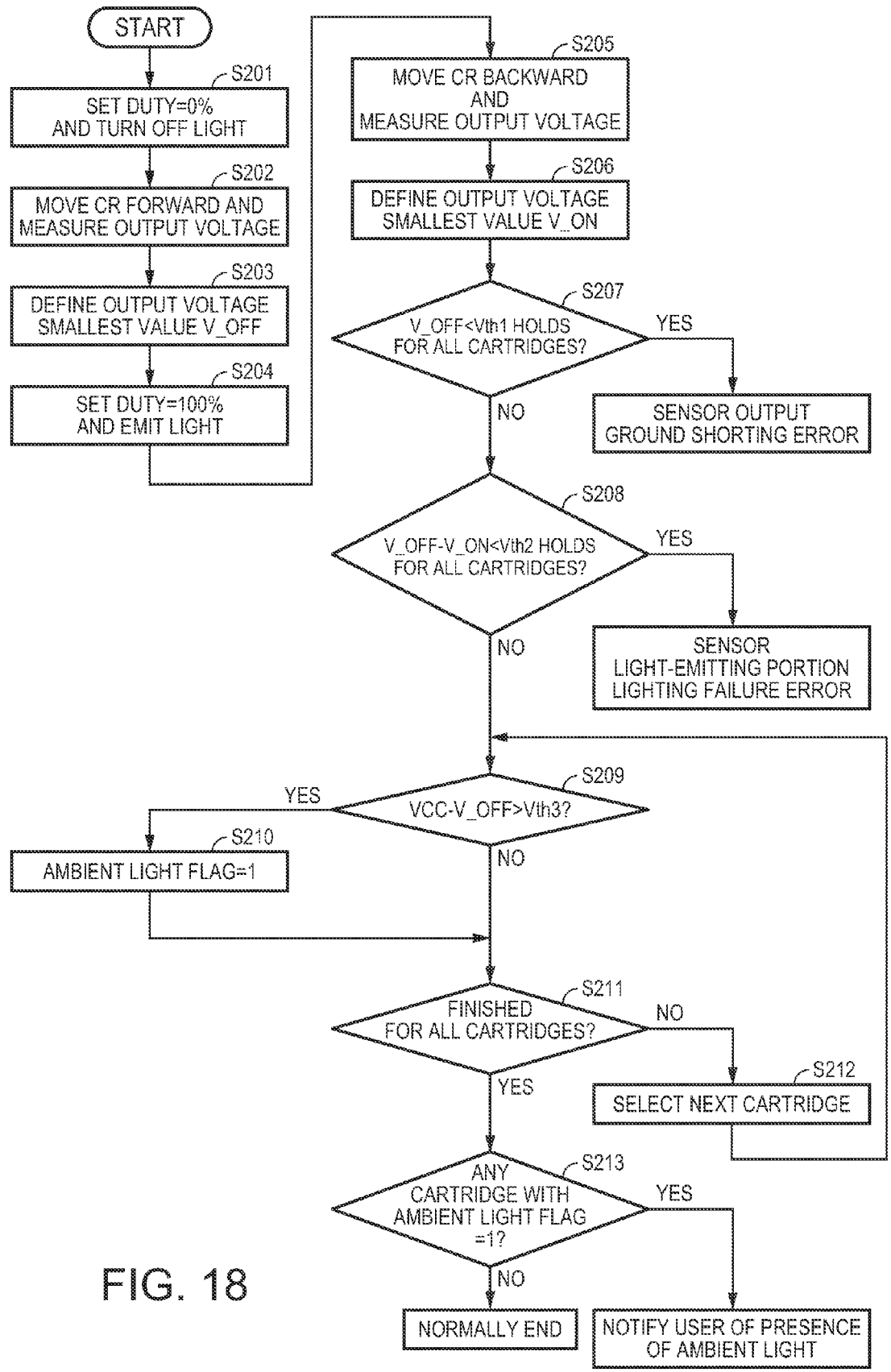
FIG. 18 is a detailed flowchart of the failure detection processing.

FIG. 18 is a flowchart showing the above processing in detail. FIG. 18 shows a flow of the processing that also handles the case where a plurality of ink cartridges are provided. Upon the processing in FIG. 18 being started, initially, Duty=0% is set and the light-emitting portion 82 is caused to turn off the light (step S201). In this state, the carriage 20 is moved forward (movement in a direction of moving away from the home position PH), and the output voltage is measured (step S202). Then, the smallest value V_OFF of the output voltage within the acquisition range is obtained for each ink cartridge (step S203). If there are four ink cartridges IC1 to IC4 as in FIG. 1, four V_OFFs are obtained.

Next, the light-emitting portion 82 is caused to emit light (step S204). For example, Duty=100% need only be set to cause the light-emitting portion 82 to emit light by the largest light amount. In this state, the carriage 20 is moved backward (movement in a direction of approaching the home position PH), and the output voltage is measured (step S205). Then, as with V_OFF, the smallest value V_ON of the output voltage within the acquisition range is obtained for each ink cartridge (step S206).

After V_OFF and V_ON are obtained, initially, it is determined for all ink cartridges whether or not V_OFF<Vth1 holds (step S207). "Vth1" here may be a value of about 0.4 V when the power source voltage is about 3.3 V, for example. The determination in step S207 corresponds to step S101 in FIG. 17. In the case of Yes in step S207, it is determined that a ground shorting error has occurred.

In the case of No in step S207, it is determined for all ink cartridges whether or not V_OFF−V_ON<Vth2 holds (step S208). "Vth2" here may be a value of about 0.1 V, for example. The determination in step S208 corresponds to step S102 in FIG. 17. In the case of Yes in step S208, it is determined that a failure in light emission by the light-emitting portion 82 has occurred, or that the sensitivity of the light-receiving portion 84 is insufficient.

In the case of No in step S208 as well, it is determined whether or not Vcc−V_OFF>Vth3 holds (step S209). "Vth3" here may be a value of about 0.2 V, for example. The determination in step S209 corresponds to step S103 in FIG. 17. In the case of Yes in step S209 regarding a given ink cartridge, an ambient light flag of this ink cartridge is set to 1 (step S210), and it is determined that ambient light is present. After the determination for the given ink cartridge ends, it is determined whether or not processing for all ink cartridges has finished (step S211). If an ink cartridge that has not been subjected to the processing remains, the next ink cartridge is selected (step S212), and the processing returns to step S209.

In the case of Yes in step S211, it means that the ambient light determination has been performed for all ink cartridges. In this case, it is determined whether or not there is any ink cartridge whose ambient light flag is 1 (step S213). In the case of Yes in step S213, it is deemed that ambient light enters, and the user is notified of it. On the other hand, in the case of No in step S213, it is deemed that there is no failure or incidence of ambient light, and the processing normally ends.

5.2 Technique that Takes Leakage Current into Consideration

Figure 19A:
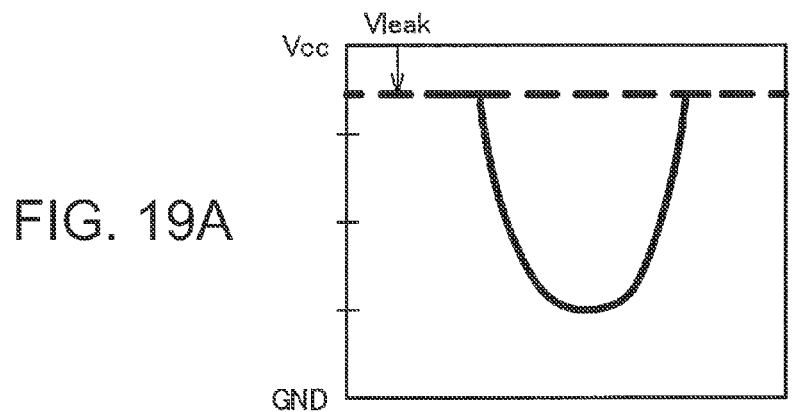
FIG. 19A is a schematic diagram showing a waveform in a normal state.
Figure 19B:
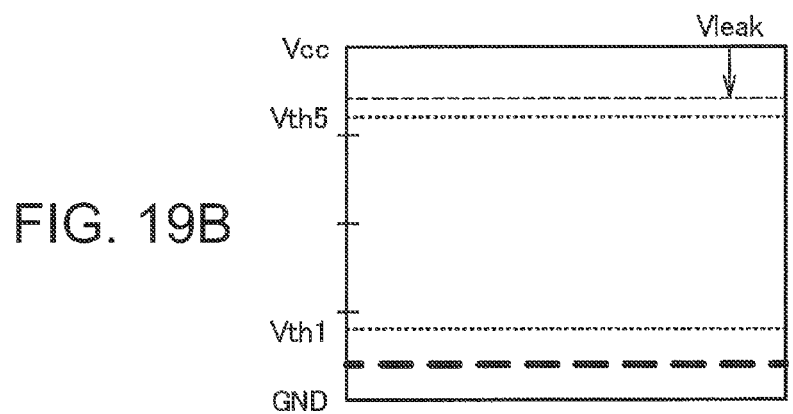
FIGS. 19B to 19D are schematic diagrams showing waveforms in the case where a failure or the like has occurred.
Figure 19C:
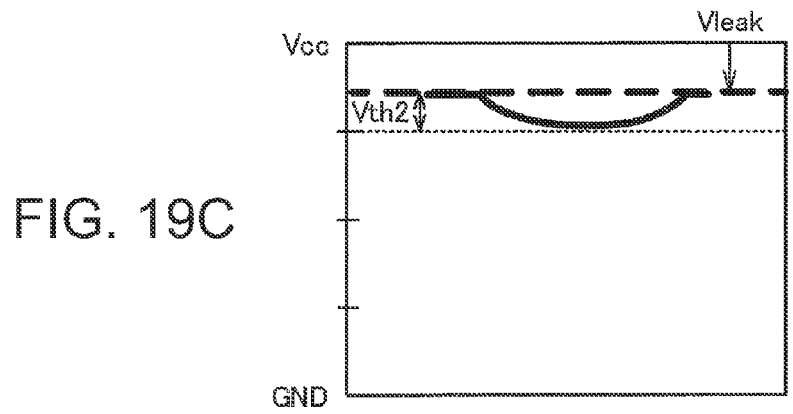
Figure 19D:
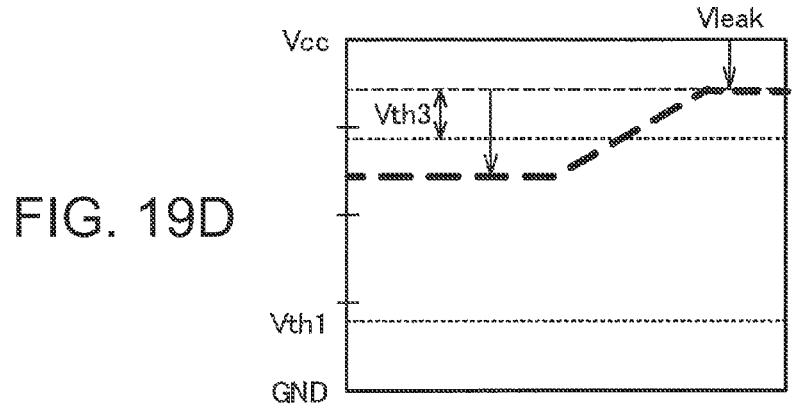

Next, the processing of the failure determination unit 120 in the case of taking leakage current into consideration will be described. When leakage current is present, a voltage drop occurs due to this leakage current, and it is therefore favorable to take into consideration the influence of the leakage current in order to accurately perform determination of a failure or the like. FIGS. 19A to 19D are schematic diagrams in the case of taking leakage current into consideration. FIG. 19A corresponds to 15A and shows a waveform in a normal state, and FIG. 19B corresponds to FIG. 15B and shows a waveform in the case where a ground shorting error has occurred. Similarly, FIG. 19C corresponds to FIG. 15C and shows a waveform in the case of a light emission failure or insufficient sensitivity of the light-receiving portion 84, and FIG. 19D corresponds to FIG. 15D and shows a waveform in the case where ambient light enters.

As shown in FIG. 15D, even in a situation where the light of the light-emitting portion 82 is turned off and a voltage drop caused due to the light-emitting portion 82 does not have to be taken into consideration, if ambient light enters, the voltage value drops due to it. That is to say, if only the voltage value at the time of turning off the light is simply used, it cannot be distinguished whether the voltage drop is due to leakage current or due to ambient light.

Accordingly, in the present embodiment, leakage current determination is performed using the relative positional relationship between the photosensor 80 and the carriage 20. An exemplary configuration of the main part of the liquid consuming apparatus is as shown in FIG. 1, and ambient light enters mainly from above (from the positive Z-axis direction) in the example in FIG. 1. For this reason, in a state where the carriage 20 is located above the photosensor 80 as in the state denoted by the CR position B in FIGS. 16A and 16B, ambient light is blocked by the carriage 20, and therefore it can be considered that the ambient light does not enter the light-receiving portion 84 of the photosensor 80. For example, if the ink cartridges IC1 to IC4 are arranged in line in this order in the main scanning direction, it may be considered that ambient light does not enter during processing for IC2 and IC3.

On the other hand, in the ink cartridges held at end portions of the holder 21, such as IC1 and IC4, the blocking effect of the carriage 20 is small as denoted by the CR position A in FIGS. 16A and 16B. Accordingly, there is a possibility that ambient light enters from an oblique direction (e.g., a direction with a given angle with respect to the Z-axis in a YZ plane).

Accordingly, in the present embodiment, the holder 21 holds the first to Nth liquid containers (corresponding to IC1 to IC4 in FIG. 1) arranged in line in the main scanning direction, and the determination unit acquires the detection signal of the photosensor 80 corresponding to each of the first to Nth liquid containers at the time of relatively moving the photosensor 80 and the holder 21, and performs leakage current detection processing based on the detection signal of the photosensor corresponding to a kth (k is an integer that satisfies 1<k<N) liquid container in the case of causing the light-emitting portion 82 to turn off the light.

The detection signal of the photosensor corresponding to the kth liquid container in the case of causing the light-emitting portion 82 to turn off the light is a detection signal at the time of turning off the light in a situation where it can be considered that ambient light does not enter. That is to say, the output voltage in this case does not drop off due to ambient light, and if the voltage value drops off, this can be considered to be due to leakage current. In the present embodiment, the voltage value corresponding to the leakage current is Vleak.

After Vleak is obtained, a given voltage value in the processing in the case of not taking leakage current into consideration need only be replaced with Vleak. Specifically, the difference between Vcc and V_OFF is used in the ambient light determination in the above processing, whereas, if leakage current is present, the voltage value is not Vcc but drops to Vleak even if ambient light is not at all present. That is to say, the difference value used in the determination with the threshold value need only be changed from the difference value between Vcc and V_OFF to the difference value between Vleak and V_OFF.

Specifically, the determination unit acquires the detection signal of the photosensor 80 corresponding to each of the first to Nth liquid containers at the time of relatively moving the photosensor 80 and the holder 21, and determines that ambient light is present if a difference value between the detection signal of the photosensor corresponding to at least one of the first liquid container and the Nth liquid container and the detection signal of the photosensor corresponding to the kth (k is an integer that satisfies 1<k<N) liquid container is larger than or equal to a fourth threshold value (e.g., Vth4).

Here, it is presumed that ambient light does not have to be taken into consideration for the kth liquid container, and that ambient light may possibly enter in the determination for the first and Nth liquid containers. That is to say, it is possible to determine whether or not ambient light is present by obtaining the difference between the detection signal in the case where there is a possibility of incidence of ambient light and the detection signal in the case where it is considered that ambient light is not present.

Figure 20:
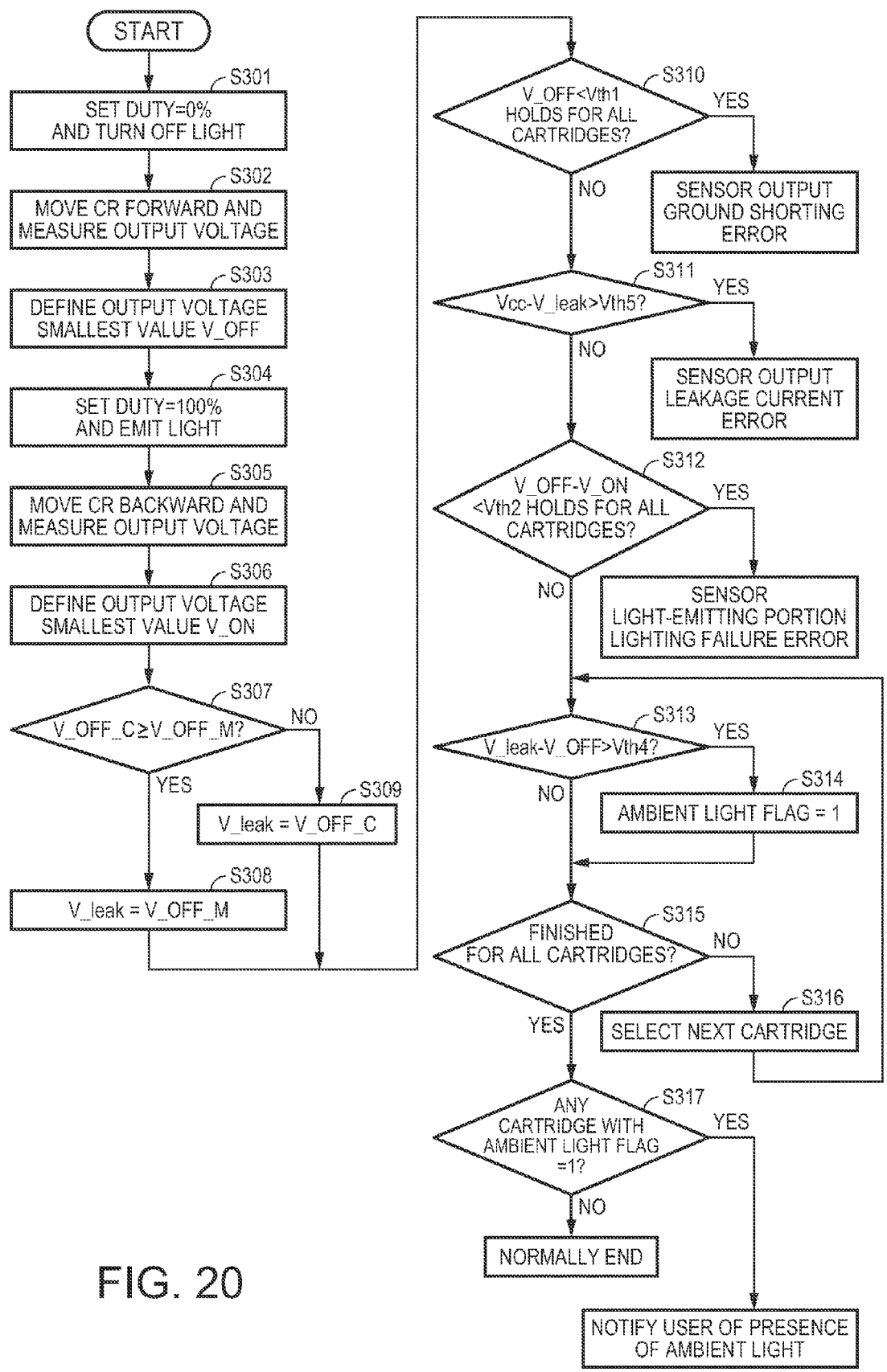
FIG. 20 is a detailed flowchart of the failure detection processing.
Figure 21:
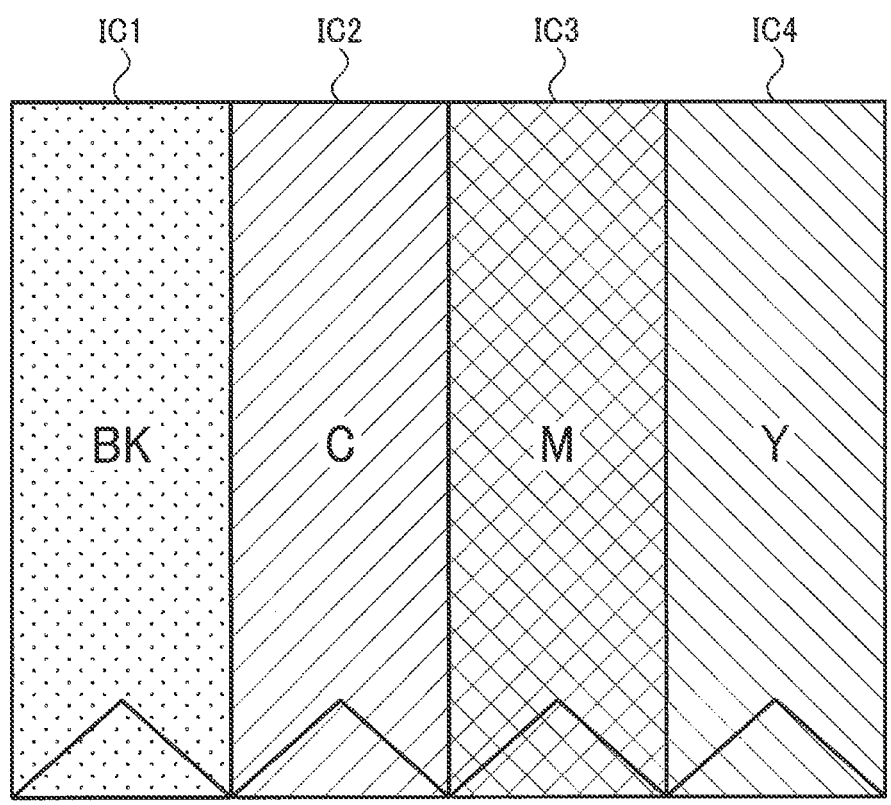
FIG. 21 is a diagram illustrating an exemplary arrangement of ink cartridges.

FIG. 20 is a flowchart illustrating, in detail, the processing performed by the failure determination unit 120 in this case. Steps S301 to S306 in FIG. 20 are similar to steps S201 to S206 in FIG. 18. After the processing in step S306, processing for comparing V_OFF_C, which is V_OFF of cyan (C), and V_OFF_M, which is V_OFF of magenta (M), is performed (step S307). Note that it is assumed here that there are four ink cartridges IC1 to IC4, and IC1, IC2, IC3, and IC4 are respectively for black (BK), cyan, magenta, and yellow (Y), as shown in FIG. 21.

If V_OFF_C≥V_OFF_M holds, Vleak=V_OFF_M is set (step S308), and if not, Vleak=V_OFF_C is set (step S309). Steps S307 to S309 are processing in which V_OFF, which is the smallest value, is set to Vleak for the ink cartridges for which ambient light does not have to be taken into consideration. That is to say, if the configuration (number and arrangement order) of the ink cartridges held by the holder 21 changes, the processing in steps S307 to S309 also needs to be changed accordingly.

V_OFF, V_ON, and Vleak have been obtained by the time step S308 or S309 finishes, and the processing then advances to the failure determination. Step S310 is ground shorting error determination as in step S207. Also, when leakage current is too large, there is a possibility of the adverse influence of the leakage current on the determination of the remaining status and the like, and accordingly determination of a leakage current error is also performed. Specifically, it is determined whether or not Vcc−Vleak>Vth5 is satisfied (step S311). "Vth5" here is a value of about 0.1 V, for example. In the case of Yes in step S311, it is deemed that the amount of leakage current is too large to perform accurate determination, and it is determined that a leakage current error has occurred.

In the case of No in step S311, it is determined whether a light emission failure has occurred or the light reception sensitivity is insufficient, as in step S208 (step S312). In the case of No in step S312 as well, it can be determined that a sensor failure has not occurred, and accordingly the ambient light determination is performed.

The ambient light determination here uses the difference between Vleak and V_OFF, rather than the difference between Vcc and V_OFF, as mentioned above. Specifically, it is determined whether or not Vleak−V_OFF>Vth4 is satisfied (step S313). Vth4 here is considered to be a threshold value similar to Vth3 mentioned above, and accordingly may be a value of about 0.2 V.

Processing in subsequent steps S314 to S317 is similar to that in steps S210 to S213 in FIG. 18, and accordingly a detailed description thereof will be omitted.

6. Exemplary Timing at which Sensor Failure Detection Processing is Performed

It is favorable that the above-described determination of a failure of the photosensor 80 is executed before the remaining status determination is performed by the remainder determination unit 130. That is to say, the failure determination need only be executed as preprocessing of the remaining status determination. However, as mentioned above, the sensitivity correction processing (in the narrow sense, the light emission amount adjustment and the threshold value setting processing) and the position correction processing are also performed as the preprocessing of the remaining status determination. Accordingly, the relationship between the sensitivity correction processing and the failure determination processing, as well as the relationship between the position correction processing and the failure determination processing will now be described.

6.1 Sensitivity Correction Processing

A specific example of the remaining status determination processing has been described above using FIG. 8 and the like. As is found from FIG. 8 and the like, the remaining status determination processing uses the output waveform of the photosensor in the case of changing the relative positional relationship between the carriage 20 and the photosensor 80. For this reason, the change of the signal waveform with respect to the change of the relative position and the change of the remaining status of the liquid needs to be clear in order to accurately perform the processing.

Specifically, as shown in FIG. 8, it is necessary to determine whether a waveform is in a state corresponding to SIK or in a state corresponding to SEP. For this purpose, it is favorable that the detection voltage Vpk1 in the case where the ink remains is clear, and the voltage difference thereof from the detection voltage in an ink near-end state (which is the lower limit voltage Vmin here, but is not limited thereto) is sufficiently large.

For example, if the sensitivity of the photosensor 80 is low, the voltage value of Vpk1 is large (i.e., the drop width from Vcc is small), and the peak Spk1 and the like is unclear. On the contrary, if the sensitivity is too high, the voltage value of Vpk1 is small (i.e., the drop width from Vcc is large), and the difference from Vmin is small.

For this reason, in the present embodiment, light emission amount adjustment and threshold value setting processing are performed as the sensitivity correction processing. Specifically, in a state where the light-emitting portion 82 is caused to emit light by a predetermined light emission amount, the carriage 20 and the photosensor 80 are relatively moved, and a waveform of the output voltage is acquired. Then, the smallest voltage value of the output voltage is obtained as V_Full. Since it is assumed here that processing is performed in a state where the cartridge is filled with the liquid, V_Full represents the voltage value of a peak corresponding to SIK in FIG. 8. If a plurality of cartridges are contained, V_Full does not need to be obtained for each cartridge, and the smallest value of the output voltages corresponding to all cartridges need only be employed.

After V_Full is obtained, adjustment is performed such that V_Full is included in a predetermined numeric range. For example, assuming that Vcc=3.3 V, adjustment is performed such that V_Full is included in the range from 1.4 V to 1.8 V. By performing this light emission amount adjustment, a voltage drop occurs at the peaks Spk1 and Spk2 in SIK by about 1.5 V to 1.9 V at most with respect to Vcc, and accordingly the peak positions are clear. Of course, since V_Full is a voltage value for one of the plurality of cartridges, there is a possibility that, with other cartridges, a voltage drop by about 1.5 V to 1.9 V does not occur at the peak position. However, it is still expected that the amount of the emitted light that enables a peak to be identified is obtained.

Furthermore, if the smallest voltage Vpk1 in a state where the liquid does not remain is in the range from 1.4 V to 1.8 V or in a similar range, the voltage difference from the lower limit voltage Vmin is a value of 1.3 V to 1.7 V, which is sufficiently large, and it is accordingly easy to set Vth and perform the determination using the set Vth.

In the present embodiment, initially, the light emission amount adjustment processing is performed as described above, without taking a failure of the photosensor 80 or the like into consideration. As shown in FIGS. 15B to 15D and the like, since the detection signal takes an extreme value at the time of a sensor failure, if the photosensor 80 has failed, the adjustment for setting V_Full within a predetermined range is not to be able to be performed. Accordingly, the sensitivity correction processing is performed first, and if the amount of the emitted light can be consequently adjusted, it is estimated that the photosensor 80 has not failed, and the aforementioned failure detection processing is not performed. On the other hand, if V_Full cannot be set within the predetermined range even though the amount of the emitted light is adjusted, it is deemed that a failure of the photosensor 80 is suspected, and the aforementioned failure detection processing is performed.

Figure 22:
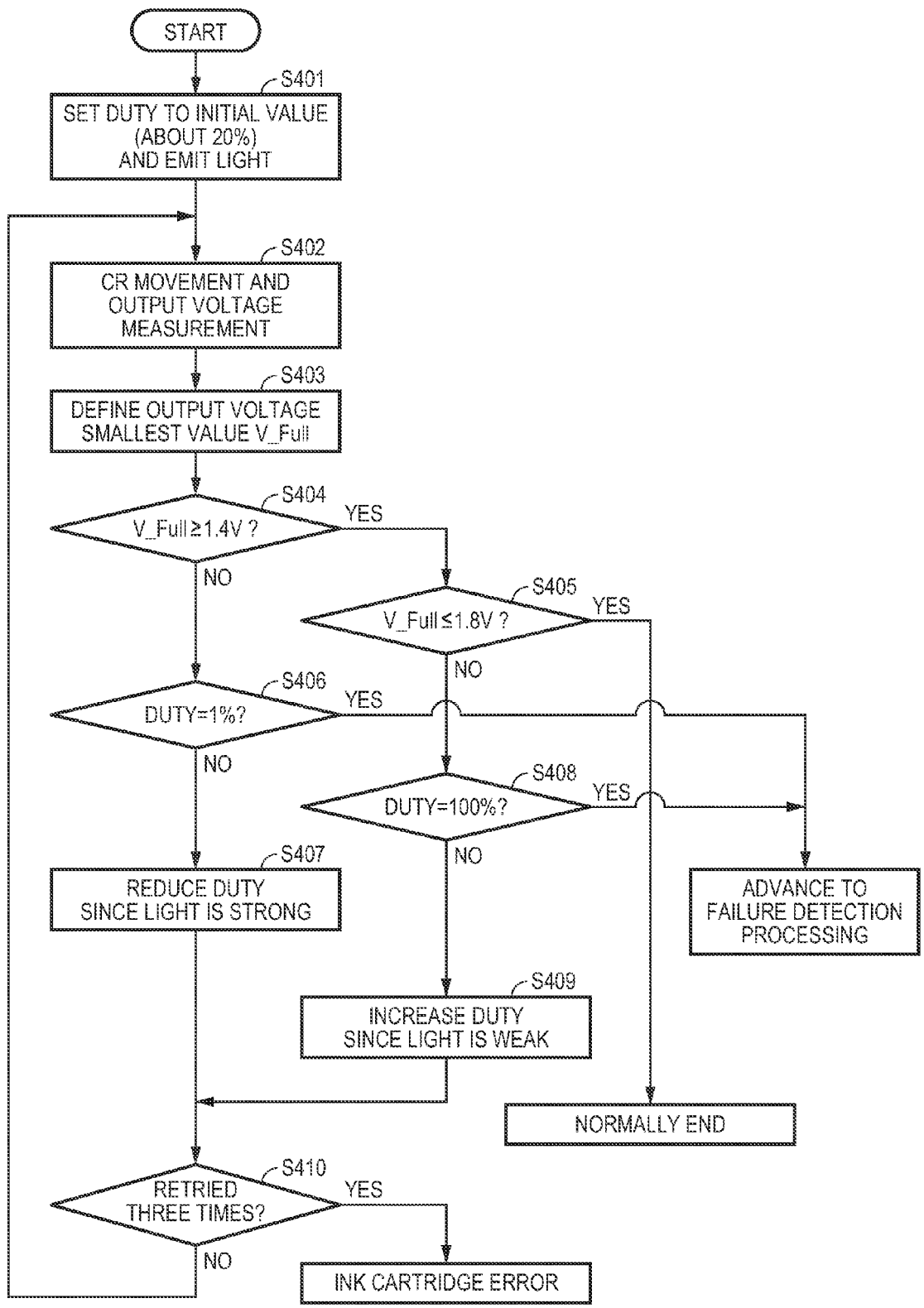
FIG. 22 is a flowchart illustrating a relationship between light emission amount adjustment processing and the failure detection processing.

FIG. 22 is a flowchart illustrating a flow of the above processing. Upon the light emission amount adjustment processing being started, initially, the amount of the emitted light is set to an initial value, which is the amount of the emitted light that has been adjusted at the time of the previous sensitivity adjustment, and the light-emitting portion 82 is caused to emit light (step S401). The initial value is about Duty=20%. In this state, the carriage 20 is moved and the output voltage is measured (step S402), and the smallest value V_Full of the output voltage is obtained (S403).

After V_Full is obtained, it is initially determined whether or not it is larger than or equal to the lower limit value of a predetermined numeric range (step S404). FIG. 22 shows an example where the lower limit value is 1.4 V, as mentioned above. If V_Full is larger than or equal to the lower limit value, it is further determined whether or not it is smaller than or equal to the upper limit value (step S405). FIG. 22 shows an example where the upper limit value is 1.8 V, as mentioned above.

In the case of Yes in step S405, i.e., if V_Full is within the predetermined numeric range, it is deemed that the amount of the emitted light is in an appropriate state, and the light emission amount adjustment processing normally ends. Although not shown in FIG. 22, other sensitivity correction processing such as the threshold value setting processing may be performed after the processing normally ends.

On the other hand, in the case of No in step S404, i.e., if V_Full is below the lower limit of the numeric range, it is determined whether or not the amount of the emitted light can be reduced (step S406). Here, since Duty=0% indicates the turning-off of the light and the lower limit duty of the amount of the emitted light is 1%, it is determined whether or not Duty=1%. In the case of No in step S406, the amount of the emitted light can be further reduced. Accordingly, it is deemed that the current amount of the emitted light is too strong, and processing for reducing the duty is performed (step S407).

In the case of No in step S405, i.e., if V_Full exceeds the upper limit of the numeric range, it is determined whether or not the amount of the emitted light can be increased (step S408). Here, since Duty=100% indicates the largest value of the amount of the emitted light, it is determined whether or not Duty=100%. In the case of No in step S408, the amount of the emitted light can be further increased. Accordingly, it is deemed that the current amount of the emitted light is too weak, and processing for increasing the duty is performed (step S409).

In the present embodiment, a problem arises in the case of Yes in step S406 and in the case of Yes in step S408. That is to say, these are the cases where it is determined that the light is too strong even though the amount of the emitted light cannot be reduced anymore, and where it is determined that the light is too weak even though the amount of the emitted light cannot be increased anymore. In these cases, it is suspected that some kind of failure has occurred in the photosensor 80, rather than a problem regarding the adjustment of the amount of the light emitted by the light-emitting portion 82. Accordingly, in the case of Yes in step S406 or in the case of Yes in step S408, the processing advances to the aforementioned failure detection processing. Specifically, the processing according to the flowchart in FIG. 18 or 20 need only be executed.

Note that, if the light emission amount adjustment can be executed as in step S407 or step S409, the processing need only be returned to step S402 in a state where the light-emitting portion 82 is caused to emit light by the adjusted amount of the emitted light to perform the processing again. However, if the adjustment amount for the amount of the emitted light in step S407 or step S409 is appropriately set, it is unlikely that a situation occurs where V_Full cannot be set within an appropriate range (and the processing does not advance to the failure determination either) even though the adjustment is repeated several times. Accordingly, in FIG. 22, it is determined whether or not a predetermined number of times of retrying has been made (step S410), and if the number of times of retrying exceeds the predetermined number, the processing does not return to step S402, it is deemed that some kind of error has occurred on the side of the ink cartridge, and the processing ends. For example, a case is conceivable that the reflection at the bottom face EF of the prism 320 is too high.

6.2 Position Correction Processing

Next, the relationship between the position correction processing and the failure detection processing will be described. The liquid remaining status determination processing is performed based on the difference between the waveforms of SIK and SEP in FIG. 8, and accordingly, the signals need to be acquired in a range of the relative positional relationship in which the difference is clear. The position correction processing is for determining this range of the relative positional relationship. Although the details thereof will be omitted, for example, the peak positions such as Spk1 and Spk2 need only be detected. That is to say, in order to accurately perform the position correction processing, the peaks of a waveform (in the narrow sense, a waveform in a state where the liquid remains) need to clearly appear.

That is to say, as preprocessing of the position correction processing (or the first processing in the position correction processing), as mentioned in the sensitivity correction processing, V_Full is obtained from a signal waveform in a state where the light-emitting portion 82 is caused to emit light by a predetermined amount of the emitted light, and the amount of the emitted light need only be adjusted such that V_Full is within a predetermined numeric range. Since V_Full is the voltage value corresponding to Vpk1 in FIG. 8 as mentioned above, the adjustment is performed such that this value is a value which can be distinguished from the voltage value at a position other than the peaks.

However, since the sensitivity correction processing is processing performed based on the premise of the remaining status determination, not only Vpk1 but also the detection voltage in an ink near-end state need to be taken into consideration. For example, if the detection voltage in an ink near-end state becomes larger than the value of Vmin as a result of an increase of Vpk1 (a decrease in the amount of the emitted light), even though the voltage value in the range from Vmin to Vcc can be used, only a narrow range within this range is used, and the difference between Vpk1 and the detection voltage in an ink near-end state also becomes small, which is not preferable. Furthermore, if Vpk1 is too small, the difference from Vmin also becomes small, which is not preferable either.

The numeric range in the above-described sensitivity correction processing takes this point into consideration. However, as long as the detection voltage in an ink near-end state is not used in the position correction processing, it does not need to be taken into consideration in the light emission amount adjustment processing serving as preprocessing of the position correction processing. That is to say, regarding the numeric range of V_Full, it is sufficient to consider the condition that the peaks such as Spk1 and Spk2 are clear, and a wider numeric range than the range from 1.4 V to 1.8 V shown in FIG. 22 can be used.

Figure 23:
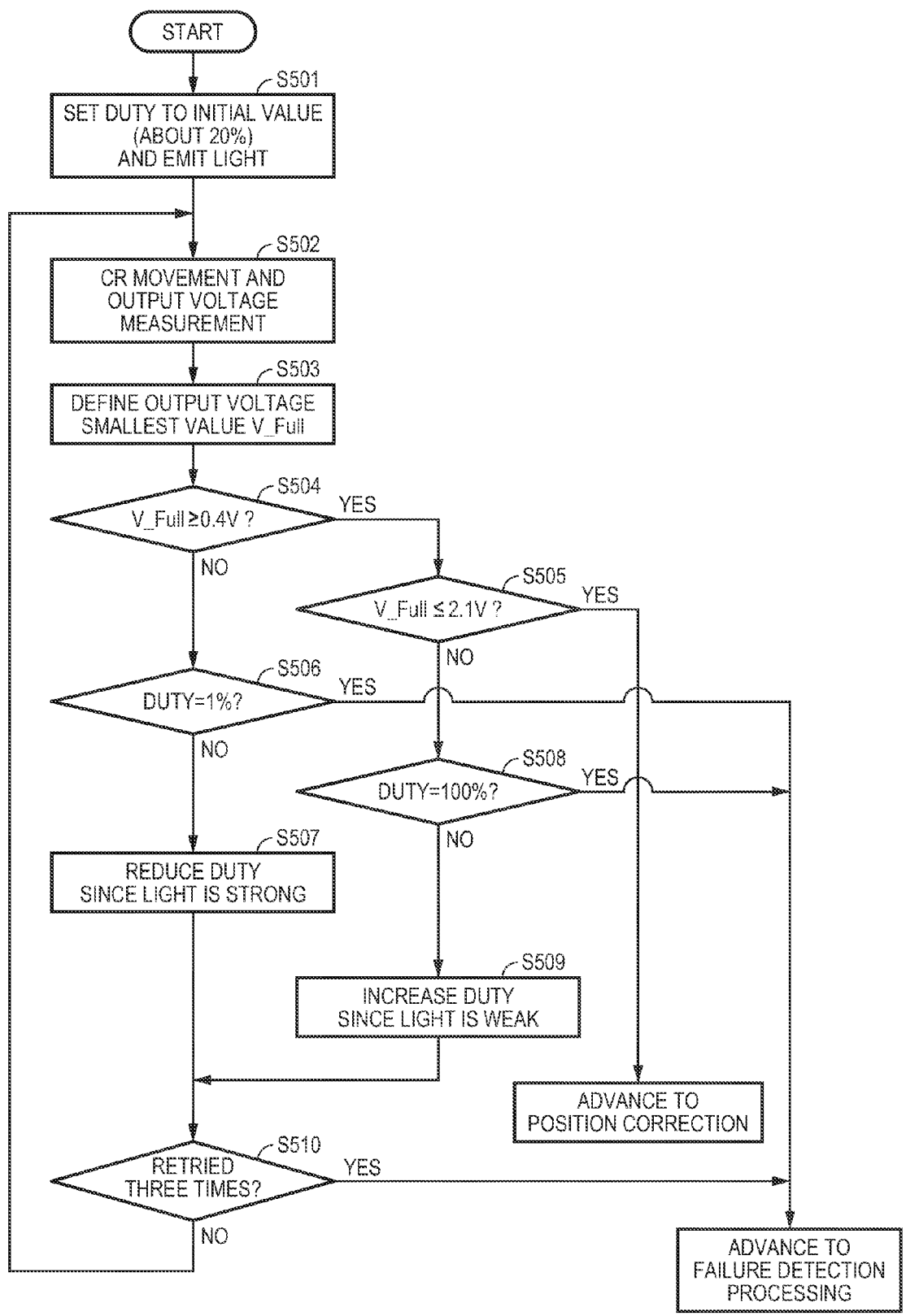
FIG. 23 is a flowchart illustrating a relationship between position correction processing and the failure detection processing.

FIG. 23 is a flowchart illustrating a flow of the above processing. As mentioned above, since this processing is the light emission amount adjustment processing performed before the position correction processing, the flow of steps S501 to S510 is similar to that of steps S401 to S410 in FIG. 22. However, since the numeric range may be wider than that in FIG. 22, the lower limit value in step S504 is a smaller value than the lower limit value in step S404. FIG. 23 shows an example of using 0.4 V, which is smaller than 1.4V in step S404. Similarly, the upper limit value in step S505 is a larger value than the upper limit value in step S405. FIG. 23 shows an example of using 2.1 V, which is larger than 1.8V in step S405.

Furthermore, since processing in FIG. 23 is performed before the position correction processing, in the case of Yes in step S505, the processing will advance to the position correction processing for detecting the peak positions using a waveform after the light emission amount adjustment and correcting the positions. Furthermore, the point of performing the failure detection processing according to the present embodiment in the case of Yes in step S506 and in the case of Yes in step S508 is similar to FIG. 22. However, although FIG. 23 shows an example where the processing advances to the failure detection processing also in the case of Yes in step S510, it may also be determined that an ink cartridge error has occurred, as in FIG. 22, and the flowcharts in FIGS. 22 and 23 may be modified in various manners.

Although the present embodiment has been described above in detail, those skilled in the art will easily understand that the embodiment can be modified in various manners so as not to substantially depart from the new matter and the effect of the invention. Accordingly, all these modifications are to be encompassed in the scope of the invention. For example, a term that is used at least once together with another term having a broader or the same meaning in the specification or the drawings can be replaced with the other term in any part of the specification or the drawings. The configuration and operations of the liquid consuming apparatus is not limited to those described in the present embodiment either, and various modifications are possible.

The entire disclosure of Japanese Patent Application No. 2014-034095, filed on Feb. 25, 2014 is expressly incorporated herein by reference.

What is claimed is:

1. A liquid consuming apparatus comprising:
   a photosensor having a light-emitting portion and a light-receiving portion;
   a holder capable of attachably and detachably holding a liquid container in which a prism having a face that faces the photosensor is arranged; and
   a controller that determines status of the photosensor based on a detection signal of the photosensor,
   wherein, when the liquid container is installed in the holder, the controller detects a failure of the photosensor based on the detection signal of the photosensor in the case of the light-emitting portion emitting light, and the detection signal of the photosensor in the case of the light-emitting portion not emitting light.

2. The liquid consuming apparatus according to claim 1, wherein the controller determines the status of the photosensor based on the detection signal of the photosensor obtained due to the light-receiving portion of the photosensor receiving reflection light that is radiated from the light-emitting portion of the photosensor and reflected at the face of the prism.

3. The liquid consuming apparatus according to claim 1, wherein the controller determines that the photosensor has failed if it is determined that detection current of the photosensor in the case of the light-emitting portion not emitting light is larger than or equal to a first threshold value.

4. The liquid consuming apparatus according to claim 1, wherein the controller determines that the photosensor has failed if a difference value between the level of the detection signal of the photosensor in the case of the light-emitting portion emitting light and the level of the detection signal of the photosensor in the case of the light-emitting portion not emitting light is smaller than or equal to a second threshold value.

5. The liquid consuming apparatus according to claim 1, wherein the controller determines that ambient light is present if a failure of the photosensor is not detected and a difference value between the level of the detection signal of the photosensor in the case of the light-emitting portion not emitting light and a given reference level is larger than or equal to a third threshold value.

6. The liquid consuming apparatus according to claim 1, wherein the holder holds first to Nth liquid containers that are arranged in line in a main scanning direction, and the controller acquires the detection signal of the photosensor corresponding to each of the first to Nth liquid containers at the time of relatively moving the photosensor and the holder, and determines that ambient light is present if a difference value between the detection signal of the photosensor corresponding to at least one of the first liquid container and the Nth liquid container and the detection signal of the photosensor corresponding to a kth (k is an integer that satisfies 1<k<N) liquid container is larger than or equal to a fourth threshold value.

7. The liquid consuming apparatus according to claim 1, wherein the holder holds first to Nth liquid containers that are arranged in line in a main scanning direction, and the controller acquires the detection signal of the photosensor corresponding to each of the first to Nth liquid containers at the time of relatively moving the photosensor and the holder, and performs processing for detecting leakage current based on the detection signal of the photosensor corresponding to a kth (k is an integer that satisfies 1<k<N) liquid container in the case of the light-emitting portion not emitting light.

8. The liquid consuming apparatus according to claim 1, wherein the controller causes the photosensor to turn off the light, relatively moves the holder and the photosensor in a predetermined direction, and acquires the detection signal in the case of causing the photosensor to turn off the light, and the controller causes the photosensor to emit light, relatively moves the holder and the photosensor in a direction opposite to the predetermined direction, and acquires the detection signal in the case of the photosensor emitting light.

9. A method for controlling a liquid consuming apparatus including a photosensor having a light-emitting portion and a light-receiving portion, and a holder capable of attachably and detachably holding a liquid container in which a prism having a face that faces the photosensor is arranged, the method comprising:

detecting, when the liquid container is installed in the holder, a failure of the photosensor based on a detection signal of the photosensor in the case of the light-emitting portion emitting light, and a detection signal of the photosensor in the case of the light-emitting portion not emitting light.

* * * * *